US012626666B2

(12) United States Patent
In

(10) Patent No.: US 12,626,666 B2
(45) Date of Patent: May 12, 2026

(54) GATE DRIVER AND DISPLAY DEVICE INCLUDING THE SAME

(71) Applicant: SAMSUNG DISPLAY CO., LTD., Yongin-si (KR)

(72) Inventor: Hai Jung In, Yongin-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 0 days.

(21) Appl. No.: 18/671,046

(22) Filed: May 22, 2024

(65) Prior Publication Data

US 2024/0321218 A1 Sep. 26, 2024

Related U.S. Application Data

(63) Continuation of application No. 18/106,321, filed on Feb. 6, 2023, now Pat. No. 12,008,963, which is a (Continued)

(30) Foreign Application Priority Data

Jun. 5, 2020 (KR) ........................ 10-2020-0068442

(51) Int. Cl.
*G09G 3/3266* (2016.01)

(52) U.S. Cl.
CPC ... *G09G 3/3266* (2013.01); *G09G 2300/0426* (2013.01); *G09G 2300/0842* (2013.01); (Continued)

(58) Field of Classification Search
CPC ......... G09G 3/3266; G09G 2300/0426; G09G 2300/0842; G09G 2310/0267; G09G 2310/0286; G09G 2310/08; G09G 2320/0233; G09G 3/3233; G09G 2300/0819; G09G 2300/0861; G09G 2320/0219; G09G 2320/0223; G09G 2320/0238; G09G 3/32; G09G 3/3225; G09G 2330/00
See application file for complete search history.

(56) References Cited

U.S. PATENT DOCUMENTS 6,590,551 B1 7/2003 Kim
8,004,480 B2 8/2011 Kim et al.
(Continued)

FOREIGN PATENT DOCUMENTS

CN 1758314 A 4/2006
CN 102044215 A 5/2011
(Continued)

*Primary Examiner* — Premal R Patel
(74) *Attorney, Agent, or Firm* — CANTOR COLBURN LLP

(57) ABSTRACT

A display device includes gate lines and pixels connected to the gate lines. The display device includes stages which provide gate signals to the gate lines, and first and second gate power lines which transfer a first voltage to the stages. A first stage among the stages includes a first node controller and a first output unit. The first node controller is connected to the second gate power line, and controls a voltage of a first control node. The first output unit is connected to the first gate power line, and outputs a first voltage of the first gate power line as a gate signal in response to a voltage of the first control node.

13 Claims, 22 Drawing Sheets

Related U.S. Application Data continuation of application No. 17/205,203, filed on Mar. 18, 2021, now Pat. No. 11,574,596.

(52) U.S. Cl.
CPC ............... *G09G 2310/0267* (2013.01); *G09G 2310/0286* (2013.01); *G09G 2310/08* (2013.01); *G09G 2320/0233* (2013.01)

(56) References Cited

U.S. PATENT DOCUMENTS

| | | | | |
|---|---|---|---|---|
| 8,300,761 | B2 | 10/2012 | Tobita | |
| 8,587,576 | B2 | 11/2013 | Park et al. | |
| 8,976,106 | B2 | 3/2015 | So et al. | |
| 8,994,621 | B2 | 3/2015 | Kishi et al. | |
| 9,105,225 | B2 | 8/2015 | Kim | |
| 9,293,100 | B2 | 3/2016 | Pyun et al. | |
| 9,311,856 | B2 | 4/2016 | Park et al. | |
| 9,324,270 | B2 | 4/2016 | Jeong | |
| 10,388,241 | B2 | 8/2019 | Wang | |
| 10,424,248 | B2 | 9/2019 | Ko et al. | |
| 10,453,386 | B2 | 10/2019 | Jang | |
| 10,621,941 | B2 | 4/2020 | Horiuchi et al. | |
| 11,024,245 | B2 | 6/2021 | Ji et al. | |
| 11,222,577 | B2 | 1/2022 | Feng et al. | |
| 2004/0095303 | A1 | 5/2004 | Moon et al. | |
| 2005/0156860 | A1 | 7/2005 | Kim et al. | |
| 2009/0262051 | A1* | 10/2009 | Kim | G11C 19/28 345/80 |
| 2009/0309477 | A1 | 12/2009 | Bang et al. | |
| 2013/0215160 | A1 | 8/2013 | Pyun | G09G 3/3655 345/94 |
| 2014/0062846 | A1 | 3/2014 | Cao | |
| 2014/0091992 | A1* | 4/2014 | Lee | G09G 3/3233 345/77 |
| 2014/0300399 | A1 | 10/2014 | Miyake | H03K 3/356026 327/296 |
| 2015/0371598 | A1 | 12/2015 | So et al. | |
| 2016/0283033 | A1 | 9/2016 | Lee | G06F 3/0445 |
| 2018/0166017 | A1 | 6/2018 | Li | G09G 3/3258 |
| 2018/0357972 | A1 | 12/2018 | Wang | G09G 3/3648 |
| 2019/0096330 | A1* | 3/2019 | Kim | G09G 3/3266 |
| 2019/0228712 | A1 | 7/2019 | Li et al. | |
| 2019/0318690 | A1 | 10/2019 | Lee et al. | |
| 2020/0168160 | A1 | 5/2020 | Oh et al. | |
| 2020/0410939 | A1 | 12/2020 | Li | G09G 3/3275 |
| 2022/0005428 | A1 | 1/2022 | Xu et al. | |
| 2022/0005432 | A1 | 1/2022 | Katsuta et al. | |

FOREIGN PATENT DOCUMENTS

| | | | |
|---|---|---|---|
| CN | 106448562 | A | 2/2017 |
| KR | 100266217 | B1 | 9/2000 |
| KR | 101314088 | B1 | 10/2013 |
| KR | 1020130130999 | A | 12/2013 |
| KR | 101429909 | B1 | 8/2014 |
| KR | 101452655 | B1 | 10/2014 |
| KR | 101839953 | B1 | 3/2018 |
| KR | 1020180049375 | A | 5/2018 |
| KR | 101881853 | B1 | 7/2018 |
| KR | 101953805 | B1 | 6/2019 |
| KR | 101994452 | B1 | 6/2019 |

* cited by examiner

GATE DRIVER AND DISPLAY DEVICE INCLUDING THE SAME

The application is a continuation of U.S. patent application Ser. No. 18/106,321, filed on Feb. 6, 2023, which is a continuation of U.S. patent application Ser. No. 17/205,203, filed on Mar. 18, 2021, which claims priority to Korean patent application 10-2020-0068442, filed on Jun. 5, 2020, and all the benefits accruing therefrom under 35 U.S.C. § 119, the content of which in its entirety is herein incorporated by reference.

BACKGROUND

1. Field

The disclosure generally relates to a gate driver and a display device including the gate driver.

2. Description of the Related Art

A display device typically includes a data driver, a gate driver, and pixels. The data driver may provide data signals to the pixels through data lines. The gate driver may generate a gate signal by using a gate power source and a clock signal, which are provided from an outside, and sequentially provide the gate signal to the pixels through gate lines. For example, the gate driver outputs the gate power source as the gate signal having a turn-on level in response to the clock signal. Each of the pixels may receive a corresponding data signal in response to the gate signal, and emit light, corresponding to the data signal.

SUMMARY

In a display device, when a gate signal is supplied to a gate line, a fluctuation may occur in the gate power source while a line capacitance of the gate line is charged. Since gate signals are sequentially output, a periodic fluctuation (or ripple) may occur in the gate power source which becomes the basis of the gate signal, and a fluctuation may occur in gate signals generated based on the gate power source.

A pixel which receives a data signal at a time at which a fluctuation occurs in a gate signal may emits light with a luminance different from that of the pixel which receives a data signal at a time at which the fluctuation does not occur in the gate signal. That is, a luminance difference may occur due to the fluctuation of the gate signal.

Embodiments provide a display device capable of reducing or preventing a luminance difference due to a fluctuation of a gate signal.

In accordance with an embodiment of the disclosure, a display device includes: a first gate power line, a second gate power line, and a third gate power line, each of which is applied with a first voltage, the first gate power line, the second gate power line, and the third gate power line, where the first gate power line, the second gate power line, and the third gate power line extend to be spaced apart from each other; and a first gate driver including a plurality of stages which outputs a plurality of gate signals. In such an embodiment, each of a first stage and a second stage among the plurality of stages includes a plurality of transistors and a capacitor which are connected to each other, and the first stage and the second stage have a same structure as each other. In such an embodiment, a first electrode of a first transistor in the first stage is connected to the first gate power line, a second electrode of the first transistor in the first stage is connected to an output terminal of the first stage, a first electrode of a first transistor in the second stage is connected to the second gate power line, and a second electrode of the first transistor in the second stage is connected to an output terminal of the second stage.

In an embodiment, each of the first stage and the second stage may further include a second transistor including a first electrode connected to the third gate power line.

In an embodiment, the display device may further include a reference gate power line. In such an embodiment, the first stage further may include a pull-down transistor including a first electrode connected to the output terminal and a second electrode connected to the reference gate power line.

In an embodiment, the display device may further include a first clock signal line, a second clock signal line, and a start signal line. In such an embodiment, the first stage may further include: a zeroth transistor including a first electrode connected to the start signal line or an output unit of a previous stage, a second electrode, and a gate electrode connected to the first clock signal line; a third transistor including a first electrode connected to a second electrode of the second transistor, a second electrode connected to the second clock signal line, and a gate electrode connected to a gate electrode of the pull-down transistor; a fourth transistor including a first electrode connected to a gate electrode of the second transistor, a second electrode connected to the first clock signal line, and a gate electrode connected to the second electrode of the zeroth transistor; a fifth transistor including a first electrode connected to the first electrode of the fourth transistor, a second electrode connected to the reference gate power line, and a gate electrode connected to the first clock signal line; a first coupling transistor including a first electrode connected to the first electrode of the fifth transistor, a second electrode, and a gate electrode connected to the reference gate power line; a coupling capacitor including a first electrode connected to the second electrode of the first coupling transistor, and a second electrode; a sixth transistor including a first electrode connected to a gate electrode of the first transistor, a second electrode connected to the second electrode of the coupling capacitor, and a gate electrode connected to the second clock signal line; and a seventh transistor including a first electrode connected to the second electrode of the coupling capacitor, a second electrode connected to the second clock signal line, and a gate electrode connected to the first electrode of the coupling capacitor.

In an embodiment, the first stage may further include: a capacitor including a first electrode connected to the second electrode of the second transistor and a second electrode connected to the gate electrode of the third transistor; and a second coupling transistor including a first electrode connected to the second electrode of the zeroth transistor, a second electrode connected to the gate electrode of the pull-down transistor, and a gate electrode connected to the reference gate power line.

In an embodiment, the first stage may further include: an eighth transistor including a first electrode connected to the first gate power line, a second electrode connected to the gate electrode of the first transistor, and a gate electrode connected to the second electrode of the zeroth transistor; and a first capacitor including a first electrode connected to the first gate power line and a second electrode connected to the gate electrode of the first transistor.

In an embodiment, the first stage may further include a reset transistor including a first electrode connected to the first gate power line, a second electrode connected to the second electrode of the zeroth transistor, and a gate electrode connected to a reset line.

In an embodiment, the first stage may further include: an eighth transistor including a first electrode connected to the second gate power line, a second electrode connected to the gate electrode of the first transistor, and a gate electrode connected to the second electrode of the zeroth transistor; and a first capacitor including a first electrode connected to the first gate power line and a second electrode connected to the gate electrode of the first transistor.

In an embodiment, the first stage may further include: a first auxiliary transistor including a first electrode connected to the start signal line or the output unit of the previous stage, a second electrode, and a gate electrode connected to the first clock signal line; a second auxiliary transistor including a first electrode connected to the second electrode of the first auxiliary transistor, a second electrode connected to the gate electrode of the third transistor, and a gate electrode connected to the reference gate power line; and a third auxiliary transistor including a first electrode connected to the gate electrode of the third transistor, a second electrode connected to the gate electrode of the pull-down transistor, and a gate electrode connected to the gate electrode of the third transistor.

In an embodiment, the first stage may further include: an eighth transistor including a first electrode connected to the second gate power line, a second electrode connected to the gate electrode of the first transistor, and a gate electrode connected to the second electrode of the zeroth transistor; and a first capacitor including a first electrode connected to the first gate power line and a second electrode connected to the gate electrode of the first transistor.

In an embodiment, the display device may further include a second gate driver including a plurality of stages which outputs a plurality of gate signals, where the first gate power line, the second gate power line, and the third gate power line may extend to the second gate driver from the first gate driver along an edge of the display device.

In an embodiment, one end portions of the first gate power line, the second gate power line, and the third gate power line may be connected to each other.

In accordance with another embodiment of the disclosure, a display device includes: a display unit including a plurality of gate lines and a plurality of pixels connected to the gate lines; and a first gate driver including a plurality of stages which provides a plurality of gate signals to the gate lines and a plurality of gate power lines which transfers a first voltage to the stages. In such an embodiment, a first stage among the stages includes: a first node controller connected to a second gate power line among the gate power lines, where the first node controller may control a voltage of a first control node; and a first output unit connected to a first gate power line among the gate power lines, where the first output unit may output a first voltage of the first gate power line as a gate signal in response to the voltage of the first control node. In such an embodiment, a substantially same voltage is applied to the first gate power line and the second gate power line.

In an embodiment, an output terminal of the first stage may be connected to two or more gate lines among the gate lines.

In an embodiment, a second stage adjacent to the first stage among the stages may include: a second node controller connected to the first gate power line, where the second node controller may control a voltage of a first control node in the second stage; and a second output unit connected to the second gate power line, where the second output unit may output a first voltage of the second gate power line as a gate signal in response to the voltage of the first control node in the second stage.

In an embodiment, the display device may further include a reference gate power line different from the gate power lines. In such an embodiment, the first output unit may include: a pull-up transistor including a first electrode connected to the first gate power line, a second electrode connected to an output terminal, and a gate electrode connected to the first control node; and a pull-down transistor including a first electrode connected to the output terminal, a second electrode connected to the reference gate power line, and a gate electrode connected to a second control node.

In an embodiment, the display device may further include a first clock signal line, a second clock signal line, and a start signal line. In such an embodiment, the first node controller may include: a first transistor including a first electrode connected to the start signal line or an output unit of a previous stage, a second electrode, and a gate electrode connected to the first clock signal line; a second transistor including a first electrode connected to the second gate power line, a second electrode, and a gate electrode; a third transistor including a first electrode connected to the second electrode of the second transistor, a second electrode connected to the second clock signal line, and a gate electrode connected to the second control node; a fourth transistor including a first electrode connected to the gate electrode of the second transistor, a second electrode connected to the first clock signal line, and a gate electrode connected to the second electrode of the first transistor; a fifth transistor including a first electrode connected to the first electrode of the fourth transistor, a second electrode connected to the reference gate power line, and a gate electrode connected to the first clock signal line; a first coupling transistor including a first electrode connected to the first electrode of the fifth transistor, a second electrode, and a gate electrode connected to the reference gate power line; a coupling capacitor including a first electrode connected to the second electrode of the first coupling transistor, and a second electrode; a sixth transistor including a first electrode connected to the first control node, a second electrode connected to the second electrode of the coupling capacitor, and a gate electrode connected to the second clock signal line; and a seventh transistor including a first electrode connected to the second electrode of the coupling capacitor, a second electrode connected to the second clock signal line, and a gate electrode connected to the first electrode of the coupling capacitor.

In an embodiment, the first node controller may further include: a capacitor including a first electrode connected to the first electrode of the second transistor and a second electrode connected to the gate electrode of the third transistor; and a second coupling transistor including a first electrode connected to the second electrode of the first transistor, a second electrode connected to the second control node, and a gate electrode connected to the reference gate power line.

In an embodiment, the first stage may further include: an eighth transistor including a first electrode connected to the first gate power line, a second electrode connected to the first control node, and a gate electrode connected to the second electrode of the first transistor; and a first capacitor including a first electrode connected to the first gate power line and a second electrode connected to the first control node.

In an embodiment, the first stage may further include a reset transistor including a first electrode connected to the first gate power line, a second electrode connected to the second electrode of the first transistor, and a gate electrode connected to a reset line.

In an embodiment, the first stage may further include: an eighth transistor including a first electrode connected to the second gate power line, a second electrode connected to the first control node, and a gate electrode connected to the second electrode of the first transistor; and a first capacitor including a first electrode connected to the first gate power line and a second electrode connected to the first control node.

In an embodiment, the first node controller may further include: a first auxiliary transistor including a first electrode connected to the start signal line or the output unit of the previous stage, a second electrode, and a gate electrode connected to the first clock signal line; a second auxiliary transistor including a first electrode connected to the second electrode of the first auxiliary transistor, a second electrode connected to the gate electrode of the third transistor, and a gate electrode connected to the reference gate power line; and a third auxiliary transistor including a first electrode connected to the gate electrode of the third transistor, a second electrode connected to the second control node, and a gate electrode connected to the gate electrode of the third transistor.

In an embodiment, the first stage may further include: an eighth transistor including a first electrode connected to the second gate power line, a second electrode connected to the first control node, and a gate electrode connected to the second electrode of the first transistor; and a first capacitor including a first electrode connected to the first gate power line and a second electrode connected to the first control node.

In an embodiment, the gate power lines may be spaced apart from each other in the first gate driver, and be connected to each other at an outside of the first gate driver.

In an embodiment, the display device may further include a second gate driver which provides a plurality of gate signals to the gate lines. In such an embodiment, the first gate driver may be disposed at an outside of the display unit, and the second gate driver may be disposed at another side of the display unit. In such an embodiment, the gate power lines may extend to the second gate driver from the first gate driver along an edge of the display unit.

In an embodiment, each of the stages may include a first power input terminal and a second power input terminal. In such an embodiment, the first power input terminal of an odd-numbered stage among the stages and the second power input terminal of an even-numbered stage among the stages may be connected to the first gate power line, and the second power input terminal of the odd-numbered stage among the stages and the first power input terminal of the even-numbered stage among the stages may be connected to the second gate power line.

In an embodiment, the display device may further include a first clock signal line and a second clock signal line. In such an embodiment, each of the stages may further include a first clock input terminal and a second clock input terminal. In such an embodiment, the first clock input terminal of the odd-numbered stage among the stages and the second clock input terminal of the even-numbered stage among the stages may be connected to the first clock signal line, and the second clock input terminal of the odd-numbered stage among the stages and the first clock input terminal of the even-numbered stage among the stages may be connected to the second clock signal line.

In an embodiment, a second stage adjacent to the first stage among the stages includes: a second node controller connected to the second gate power line, where the second node controller may control a voltage of a first control node in the second stage; and a second output unit connected to a third gate power line among the gate power lines, where the second output unit may output a first voltage of the third gate power line as a gate signal in response to the voltage of the first control node in the second stage. In such an embodiment, a substantially same voltage may be applied to the first gate power line, the second gate power line, and the third gate power line.

In an embodiment, each of the stages may include a first power input terminal and a second power input terminal. In such an embodiment, the second power input terminal of each of the stages may be connected to the second gate power line. In such an embodiment, the first power input terminal of an odd-numbered stage among the sages may be connected to the first gate power line, and the first power input terminal of an even-numbered stage among the sages may be connected to the third gate power line.

In an embodiment, the first stage may further include: an eighth transistor including a first electrode connected to the second gate power line and a second electrode connected to the first control node; and a first capacitor including a first electrode connected to the first gate power line and a second electrode connected to the first control node.

In an embodiment, the first stage may further include: an eighth transistor including a first electrode connected to the first gate power line and a second electrode connected to the first control node; and a first capacitor including a first electrode connected to the first gate power line and a second electrode connected to the first control node.

In an embodiment, the display device may further include a first clock signal line, a second clock signal line, a start signal line, and a reference gate power line different from the gate power lines. In such an embodiment, the first node controller may include: a first transistor including a first electrode connected to the start signal line or an output unit of a previous stage, a second electrode, and a gate electrode connected to the first clock signal line; a second transistor including a first electrode connected to the second gate power line, a second electrode, and a gate electrode; a third transistor including a first electrode connected to the second electrode of the second transistor, a second electrode connected to the second clock signal line, and a gate electrode connected to a second control node; a first auxiliary transistor including a first electrode connected to the start signal line or the output unit of the previous stage, a second electrode, and a gate electrode connected to the first clock signal line; a second auxiliary transistor including a first electrode connected to the second electrode of the first auxiliary transistor, a second electrode connected to the gate electrode of the third transistor, and a gate electrode connected to the reference gate power line; and a third auxiliary transistor including a first electrode connected to the gate electrode of the third transistor, a second electrode connected to the second control node, and a gate electrode connected to the gate electrode of the third transistor.

In an embodiment, the first stage may further include: an eighth transistor including a first electrode connected to the second gate power line, a second electrode connected to the first control node, and a gate electrode connected to the second electrode of the first transistor; and a first capacitor including a first electrode connected to the first gate power line and a second electrode connected to the first control node.

In an embodiment, the first gate power line, the second gate power line, and the third gate power line may be spaced apart from each other in the first gate driver, and be connected to each other at an outside of the first gate driver.

In accordance with still another embodiment of the disclosure, a display device includes: a substrate including a display area, a non-display area, and a pad area, which are distinguished from one another; a plurality of gate lines and a plurality of pixels disposed on the substrate in the display area, where the pixels are connected to the gate lines; a gate driver disposed on the substrate in the non-display area, where the gate driver includes a plurality of stages connected to the gate lines; a gate power pad disposed on the substrate in the pad area; and a plurality of gate power lines disposed on the substrate, where the gate power lines connect the gate power pad and the stages to each other. In such an embodiment, the gate power lines are spaced apart from each other in the non-display area, and are connected to each other in the pad area.

In an embodiment, each of the stages may be connected to two or more gate lines among the gate lines.

In an embodiment, each of the stages may include a first power input terminal and a second power input terminal. In such an embodiment, the first power input terminal of an odd-numbered stage among the stages and the second power input terminal of an even-numbered stage among the stages may be connected to a first gate power line among the gate power lines, and the second power input terminal of the odd-numbered stage among the stages and the first power input terminal of the even-numbered stage among the stages may be connected to a second gate power line among the gate power lines.

In an embodiment, each of the stages may include a first power input terminal and a second power input terminal. The second power input terminal of each of the stages may be connected to a second gate power line among the gate power lines. In such an embodiment, the first power input terminal of an odd-numbered stage among the stages may be connected to a first gate power line among the gate power lines, and the first power input terminal of an even-numbered stage among the stages may be connected to a third gate power line among the gate power lines.

In accordance with still another embodiment of the disclosure, a display device includes: a plurality of stages which provides a plurality of gate signals to a plurality of gate lines; and a plurality of gate power lines which transfers a first voltage to the stages, where the first voltage is a direct-current voltage. In such an embodiment, a first stage among the stages includes: a first node controller connected to a second gate power line among the gate power lines, where the first node controller controls a voltage of a first control node; and a first output unit connected to a first gate power line among the gate power lines, where the first output unit outputs a first voltage of the first gate power line as a gate signal in response to the voltage of the first control node. In such an embodiment, a substantially same voltage is applied to the first gate power line and the second gate power line.

BRIEF DESCRIPTION OF THE DRAWINGS

The above and other features of the invention will become more apparent by describing in further detail embodiments thereof with reference to the accompanying drawings, in which.

DETAILED DESCRIPTION

Figure 1:
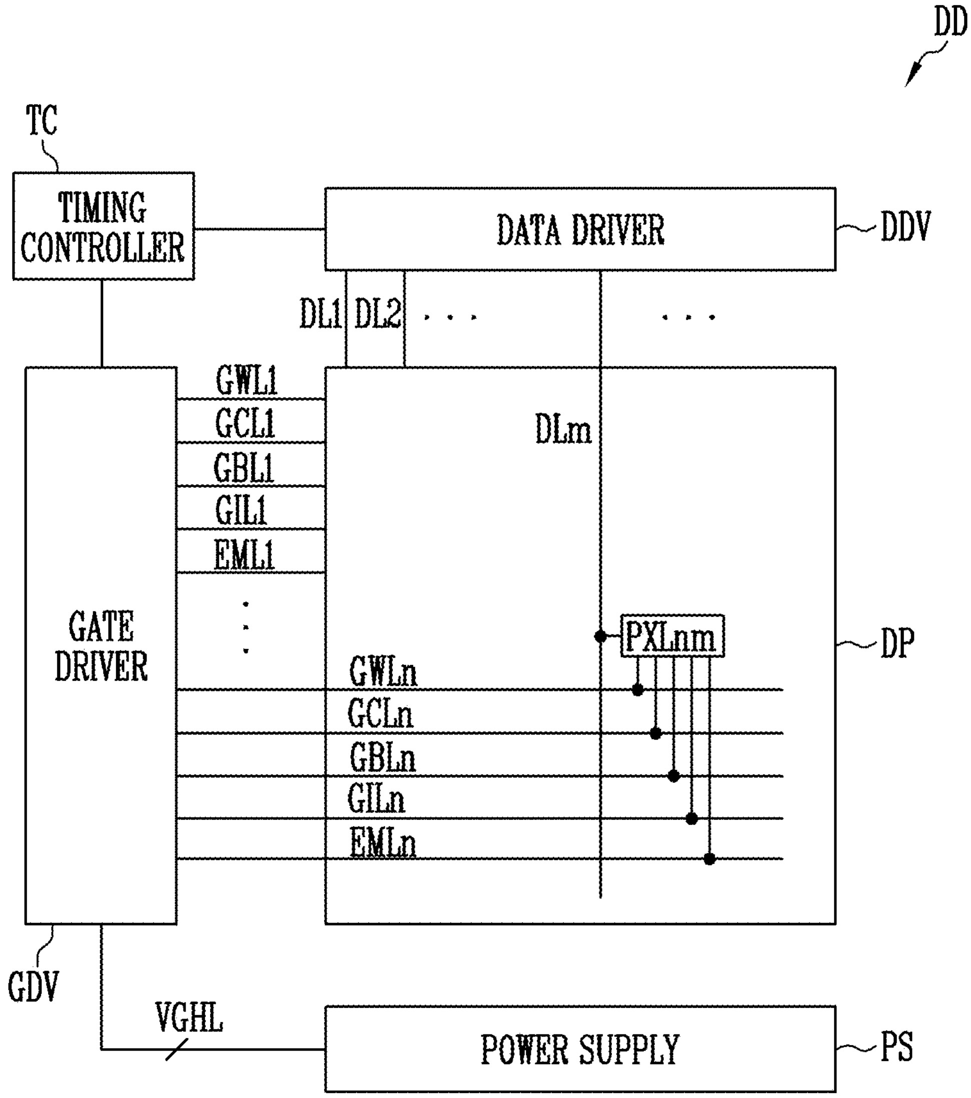
FIG. 1 is a block diagram illustrating a display device in accordance with embodiments of the disclosure.

The invention now will be described more fully hereinafter with reference to the accompanying drawings, in which various embodiments are shown. This invention may, however, be embodied in many different forms, and should not be construed as limited to the embodiments set forth herein. Rather, these embodiments are provided so that this disclosure will be thorough and complete, and will fully convey the scope of the invention to those skilled in the art. Like reference numerals refer to like elements throughout.

It will be understood that when an element is referred to as being "on" another element, it can be directly on the other element or intervening elements may be present therebetween. In contrast, when an element is referred to as being "directly on" another element, there are no intervening elements present.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

The terminology used herein is for the purpose of describing particular embodiments only and is not intended to be limiting. As used herein, "a", "an," "the," and "at least one" do not denote a limitation of quantity, and are intended to include both the singular and plural, unless the context clearly indicates otherwise. For example, "an element" has the same meaning as "at least one element," unless the context clearly indicates otherwise. "At least one" is not to be construed as limiting "a" or "an." "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The term "lower," can therefore, encompasses both an orientation of "lower" and "upper," depending on the particular orientation of the figure. Similarly, if the device in one of the figures is turned over, elements described as "below" or "beneath" other elements would then be oriented "above" the other elements. The terms "below" or "beneath" can, therefore, encompass both an orientation of above and below.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within +30%, 20%, 10% or 5% of the stated value.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein. In addition, the size and thickness of each component illustrated in the drawings are arbitrarily shown for better understanding and ease of description, and the disclosure is not limited thereto.

Hereinafter, embodiments of the disclosure will be described in detail with reference to the accompanying drawings.

FIG. 1 is a block diagram illustrating a display device in accordance with embodiments of the disclosure.

Referring to FIG. 1, an embodiment of the display device DD may include a timing controller TC, a data driver DDV, a gate driver GDV, and a display unit DP (or a display panel). In such an embodiment, the display device DD may further include a power supply PS.

The timing controller TC may receive an external input signal from an outside, e.g., an external processor. The external input signal may include a vertical synchronization signal, a horizontal synchronization signal, a data enable signal, an image data, (e.g., RGB data), and a clock signal.

The vertical synchronization signal may include a plurality of pulses. At a time at which each of the pulses is generated, a previous frame period may be ended and a current frame period may be started. An interval between adjacent pulses among the pulses of the vertical synchronization signal may correspond to one frame period. The horizontal synchronization signal may include a plurality of pulses. At a time at which each of the pulses is generated, a previous horizontal period may be ended and a current horizontal period may be started. An interval between adjacent pulses among the pulses of the horizontal synchronization signal may correspond to one horizontal period. The data enable signal may indicate that RGB data is supplied in a horizontal period. In one embodiment, for example, the RGB data corresponding to the data enable signal may be supplied in a pixel row unit (e.g., to pixels connected to the same write gate line) in horizontal periods.

The timing controller TC may generate grayscale values, based on the RGB data, to correspond to specifications of the display device DD. In one embodiment, for example, the grayscale values may mean RGB data realigned corresponding to a resolution of the display unit DP, etc.

In an embodiment, the timing controller TC may generate control signals for the data driver DDV and the gate driver GDV, based on the external input signal, to correspond to the specifications of the display device DD.

The data driver DDV may generate data voltages (or data signals) by using the grayscale values and the control signals, which are received from the timing controller TC, and provide the data voltages to data lines DL1, DL2, . . . and DLm. Here, m may be a positive integer. In one embodiment, for example, the data driver DDV may sample grayscale values by using a clock signal, generate data voltages corresponding to the grayscale values, and supply the data voltages to the data lines DL1, DL2, . . . , and DLm in the pixel row unit.

The gate driver GDV may receive control signals from the timing controller TC, generate gate signals, based on the control signals, and provide the gate signals to gate lines GWL1, GCL1, GBL1, GIL1, EML1, . . . , GWLn, GCLn, GBLn, GILn, and EMLn. Here, n is a positive integer.

In an embodiment, the gate driver GDV may receive gate power voltages (e.g., voltages having a logic high level) through gate power lines VGHL from the power supply PS, and provide gate signals having a pulse of a gate power voltage to the gate lines GWL1, GCL1, GBL1, GIL1, EML1, . . . , GWLn, GCLn, GBLn, GILn, and EMLn (e.g., compensation gate lines GCL1, . . . , and GCLn). The gate power voltages supplied through the gate power lines VGHL has a direct-current ("DC") form, and may have a same voltage level.

A configuration of the gate driver GDV will be described later in greater detail with reference to FIGS. 2A, 2B, and 5.

The display unit DP includes pixels. In one embodiment, for example, a pixel PXLnm may be connected to a corresponding data line DLm, a corresponding write gate line GWLn, a corresponding compensation gate line GCLn, a corresponding bypass gate line GBLn, a corresponding initialization gate line GILn, and a corresponding emission gate line EMLn.

The power supply PS may supply gate power voltages to the gate driver GDV through the gate power lines VGHL.

In an embodiment, the power supply PS may be implemented as an independent integrated circuit, but the disclosure is not limited thereto. In one alternative embodiment, for example, the power supply PS along with the data driver DDV may be implemented as a single integrated circuit. In such an embodiment, the gate power voltages may be provided to the gate driver GDV from the data driver DDV.

Figure 2A:
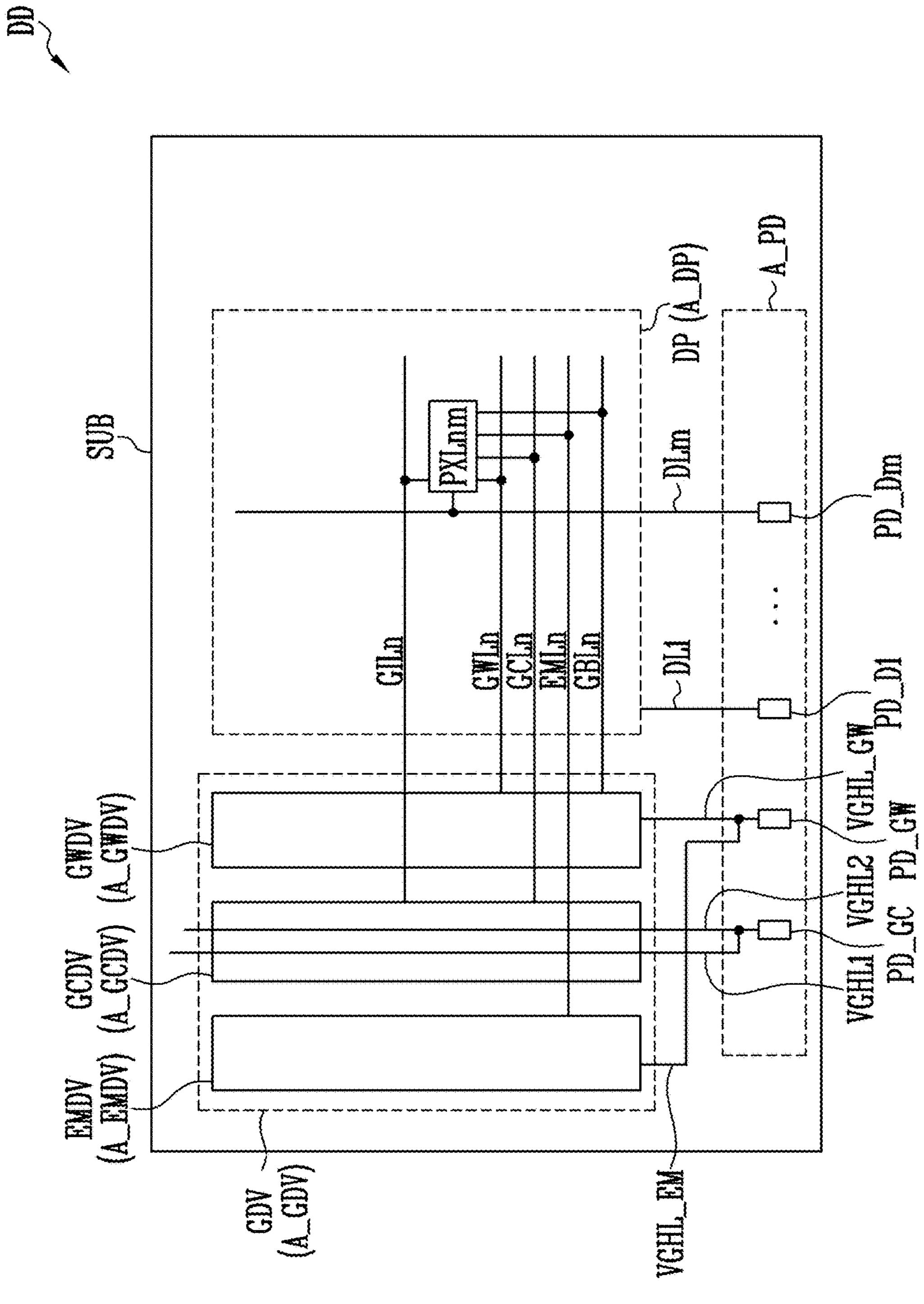
FIGS. 2A and 2B are plan views illustrating an embodiment of the display device shown in FIG. 1.
Figure 2B:
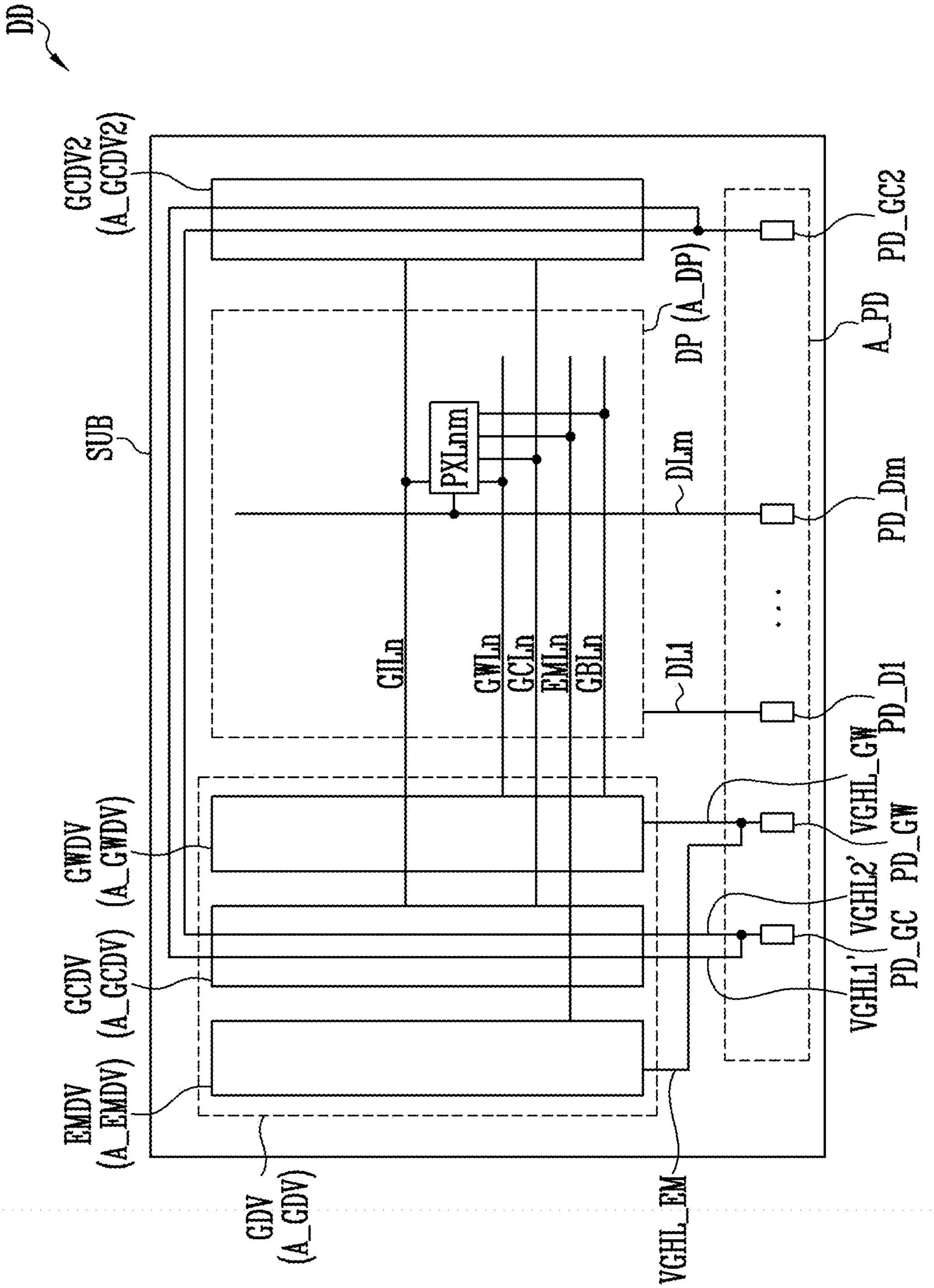

FIGS. 2A and 2B are plan views illustrating an embodiment of the display device shown in FIG. 1. In FIGS. 2A and 2B, the display device DD is briefly illustrated based on the gate driver GDV.

In an embodiment, referring to FIGS. 1 and 2A, the display device may include a substrate SUB.

The substrate SUB may include a display area A_DP and a non-display area located in at least one side portion of the display area A_DP, and the non-display area may include a pad area A_PD and a gate circuit area A_GDV (or first gate circuit area). The display area A_DP, the pad area A_PD, and the gate circuit area A_GDV may be distinguished from one another. In one embodiment, for example, the pad area A_PD may be located in a lower side portion of the display area A_DP, and the gate circuit area A_GDV may be located in a left side portion of the display area A_DP.

Data lines DL1, . . . , and DLm, gate lines GWLn, GCLn, GBLn, GILn, and EMLn, and a pixel PXLnm may be disposed or provided in the display area A_DP of the substrate SUB. The display area A_DP of the substrate SUB may correspond to the display unit DP described above with reference to FIG. 1.

Pads PD_D1, . . . , PD_Dm, PD_GC, and PD_GW may be disposed in the pad area A_PD on the substrate SUB.

Data pads PD_D1, . . . , and PD_Dm may be respectively connected to the data lines DL1, . . . , and DLm. The data lines DL1, . . . , and DLm may be connected to the data driver DDV (see FIG. 1) via the data pads PD_D1, . . . , and PD_Dm.

A first gate power pad PD_GC may be connected to gate power lines. In one embodiment, for example, as shown in FIG. 2A, the first gate power pad PD_GC may be connected to a first gate power line VGHL1 and a second gate power line VGHL2. The first gate power line VGHL1 and the second gate power line VGHL2 may be disposed or provided in the non-display area of the substrate SUB, be connected to each other in the pad area A_PD, and be disposed to be spaced apart from each other in the non-display area out of the pad area A_PD. In an embodiment, the first gate power line VGHL1 and the second gate power line VGHL2 are connected to the first gate power pad PD_GC as illustrated in FIG. 2A, but the disclosure is not limited thereto. In one alternative embodiment, for example, where the size of the pad area A_PD is sufficiently large, the first gate power line VGHL1 and the second gate power line VGHL2 may be respectively connected to different power pads, and a same gate power voltage may be applied to the first gate power line VGHL1 and the second gate power line VGHL2 through the different power pads. The first gate power pad PD_GC may be connected to the power supply PS (see FIG. 1), and a gate power voltage (e.g., a voltage having a logic high level) may be applied to the first gate power pad PD_GC from the power supply PS.

A second gate power pad PD_GW may be connected to a write gate power line VGHL_GW and an emission gate power line VGHL_EM. The write gate power line VGHL_GW and the emission gate power line VGHL_EM may be disposed or provided in the non-display area of the substrate SUB, and be connected to each other in the pad area A_PD. The write gate power line VGHL_GW and the emission gate power line VGHL_EM may be separated from the first gate power line VGHL1 and the second gate power line VGHL2. The second gate power pad PD_GW may be connected to the power supply PS (see FIG. 1), and a gate power voltage (e.g., a voltage having a logic high level) may be applied to the second gate power pad PD_GW from the power supply PS. A voltage level of the gate power voltage applied to the second gate power pad PD_GW may be equal to that of the gate power voltage applied to the first gate power pad PD_GC, but the disclosure is not limited thereto.

A gate driver GDV may be formed or disposed in the gate circuit area A_GDV of the substrate SUB.

The gate driver GDV may include a write gate driver GWDV, a compensation gate driver GCDV (or a first compensation gate driver), and an emission driver EMDV. The gate circuit area A_GDV of the substrate SUB may include a write gate circuit area A_GWDV, a compensation gate circuit area A_GCDV (or a first compensation gate circuit area), and an emission circuit area A_EMDV, which are distinguished from one another, and the write gate driver GWDV, the compensation gate driver GCDV, and the emission driver EMDV may be respectively disposed or formed in the write gate circuit area A_GWDV, the compensation gate circuit area A_GCDV, and the emission circuit area A_EMDV.

In an embodiment, the write gate driver GWDV may be the closest to the display unit DP, the compensation gate driver GCDV may be further spaced apart from the display unit DP than the write gate driver GWDV is, and the emission driver EMDV may be further spaced apart from the display unit DP than the compensation gate driver GCDV is. As will be described later in greater detail with reference to FIG. 7B, a write gate signal generated by the write gate driver GWDV is most sensitive to resistance-capacitance ("RC") delay since the width of a pulse of the write gate signal is the smallest, and an emission gate signal generated by the emission driver EMDV is most insensitive to the RC delay since the width of a pulse of the emission gate signal is largest.

The write gate driver GWDV may be in a form of a shift register, and include a plurality of stages. The write gate driver GWDV (or write stages) may be connected to the write gate power line VGHL_GW. The write stages may sequentially generate write gate signals having a turn-on level (e.g., a logic low level), in response to a write start signal received from the timing controller TC (see FIG. 1). The write gate signals having the turn-on level may be provided to corresponding write gate lines GWL1, . . . , and GWLn (see FIG. 1), respectively. In an embodiment, the write gate signals are used as bypass gate signals, and may be provided even to bypass gate lines GBL1 . . . , and GBLn (see FIG. 1). In one embodiment, for example, a write gate signal (i.e., a subsequent write gate signal) generated subsequent to a write gate signal applied to the write gate line GWLn may be provided as a bypass gate signal to the bypass gate line GBLn. However, the disclosure is not limited thereto. In one alternative embodiment, for example, the write gate signal applied to the write gate line GWLn may be provided as a bypass gate signal to the bypass gate line GBLn.

The compensation gate driver GCDV (or initialization gate driver) may be in a form of a shift register, and include a plurality of compensation stages (or initialization stages). The compensation gate driver GCDV (or each of the compensation stages) may be connected to the first gate power line VGHL1 and the second gate power line VGHL2. The compensation stages may sequentially generate compensation gate signals having a turn-on level (e.g., a logic high level), in response to a compensation start signal (or initialization start signal) received from the timing controller TC (see FIG. 1). In one embodiment, for example, each of the compensation stages may output, as a pulse of a corresponding compensation gate signal, one of a first gate power voltage in the first gate power line VGHL1 and a second gate power voltage in the second gate power line VGHL2. The compensation gate signals may be provided to corresponding compensation gate lines GCL1, . . . , GCLn (see FIG. 1), respectively. In one embodiment, for example, odd-numbered compensation stages among the compensation stages may output the first gate power voltage in the first gate power line VGHL1 as compensation gate signals, and even-numbered compensation stages among the compensation stages may output the second gate power voltage in the second gate power line VGHL2 as compensation gate signals. Therefore, a drop (or fluctuation) of the second gate power voltage (i.e., the second gate power voltage in the second gate power line VGHL2) generated at times at which the even-numbered compensation stages among the compensation stages output compensation gate signals may have no influence on the first gate power voltage in the first gate power line VGHL1. In such an embodiment, although a same gate power voltage is applied to the odd-numbered compensation stages and the even-numbered compensation stages, the first gate power line VGHL1 and the second gate power line VGHL2, which are used to transfer gate power voltages, are separated from each other. In such an embodiment, the first gate power line VGHL1 and the second gate power line VGHL2 are connected to each other in the pad area A_PD, such that a drop of the second gate power voltage in the second gate power line VGHL2 is reduced while passing through the pad area A_PD (i.e., a path for a voltage drop is lengthened and RC delay occurs in the voltage drop due to a capacitance corresponding to the path), and is rapidly recovered or charged by a gate power voltage applied to the first gate power pad PD_GC. Thus, the period of a ripple of the gate power voltage (i.e., each of the first gate power voltage and the second gate power voltage) is increased, and the ripple and luminance difference of the compensation gate signals due to the ripple of the gate power voltage may be reduced. Such an embodiment where the ripple and luminance difference of compensation gate signals are reduced will be described in detail with reference to FIG. 7B.

In an embodiment, the compensation gate signals are used as initialization gate signals, and compensation gate signals having a turn-on level may be provided even to corresponding initialization gate lines GIL1, . . . , and GILn (see FIG. 1). In one embodiment, for example, a compensation gate signal (i.e., a previous compensation gate signal) generated prior to a compensation gate signal applied to the compensation gate line GCLn may be provided as an initialization gate signal to the initialization gate line GILn.

The emission driver EMDV may be in a form of a shift register, and include a plurality of emission stages. The emission driver EMDV (or emission stages) may be connected to the emission gate power line VGHL_EM. The emission stages may sequentially generate emission gate signals having a turn-off level, in response to an emission start signal receive from the timing controller TC (see FIG. 1). Write gate signals having a turn-off level (e.g., a logic high level) may be provided to corresponding emission gate lines EML1, . . . , and EMLn (see FIG. 1). In one embodiment, for example, the emission stages may output a gate power voltage applied to the emission gate power line VGHL_EM as a pulse of an emission gate signal.

In an embodiment, as shown in FIG. 2A, the compensation gate driver GCDV) may be disposed at one side (e.g., a left side) of the display device DP, but the disclosure is not limited thereto.

In an alternative embodiment, as shown in FIG. 2B, the substrate SUB may further include a second compensation gate circuit area A_GCDV2 located at an opposing side (e.g., a right side) of the display area A_DP, and a second compensation gate driver GCDV2 may be formed or disposed in the second compensation gate circuit area A_GCDV2. The second compensation gate driver GCDV2 may be included in the gate driver GDV.

Each of a first gate power line VGHL1' and a second gate power line VGHL2' may extend up to the second compensation gate circuit area A_GCDV2 along an edge of the display area A_DP. In such an embodiment, as described above with reference to FIG. 2A, the first gate power line VGHL1' and the second gate power line VGHL2' may be connected to each other in the pad area A_PD. The first gate power line VGHL1' and the second gate power line VGHL2' may not be connected to each other in the non-display area except the pad area A_PD, and may be disposed to be spaced apart from each other. In such an embodiment, as shown in FIG. 2B, one ends of the first gate power line VGHL1' and the second gate power line VGHL2' may be connected to the first gate power pad PD_GC provided in the pad area A_PD, and one ends of the first gate power line VGHL1' and the second gate power line VGHL2' may be connected to a third gate power pad PD_GC2 provided in the pad area A_PD.

The second compensation gate driver GCDV2 may be substantially the same as or similar to the compensation gate driver GCDV (or the first compensation gate driver) described above, except an arrangement position thereof.

In an embodiment, the second compensation gate driver GCDV2 may be in a form of a shift register, and include a plurality of compensation stages (or initialization stages). The second compensation gate driver GCDV2 (or each of the compensation stages) may be connected to the first gate power line VGHL1' and the second gate power line VGHL2'. The compensation stages may sequentially generate compensation gate signals having a turn-on level (e.g., a logic high level), in response to a compensation start signal (or initialization start signal) received from the timing controller TC (see FIG. 1). The compensation gate signals generated by the second compensation gate driver GCDV2 may be provided to corresponding compensation gate lines GCL1, . . . , and GCLn (see FIG. 1).

The compensation gate lines GCL1, . . . , and GCLn (see FIG. 1) may be connected to the compensation gate driver GCDV (or first compensation gate driver) and the second compensation gate driver GCDV2, and the compensation gate signals may be applied to the compensation gate lines GCL1, . . . , and GCLn from both opposing sides of the display unit DP. Accordingly, RC relay of the compensation gate signals may be minimized.

In an embodiment, the compensation gate signals generated by the second compensation gate driver GCDV2 are used as initialization gate signals, and may be provided even to corresponding initialization gate lines GIL1, . . . , and GILn (see FIG. 1).

In an embodiment, as shown in FIG. 2B, only the second compensation gate driver GCDV2 may be disposed at the right side of the display area A_DP, but the disclosure is not limited thereto. In one alternative embodiment, for example, a second write gate driver and a second emission driver may be further disposed at the right side of the display area A_DP. In such an embodiment, RC delay of the write gate signals and RC delay of the emission gate signals may be minimized.

In an embodiment, as described with reference to FIGS. 2A and 2B, the display device DD includes the first gate power line VGHL1 and the second gate power line VGHL2 (or the first gate power line VGHL1' and the second gate power line VGHL2') connected to the compensation gate driver GCDV (or each of the compensation stages). The first gate power line VGHL1 and the second gate power line VGHL2 are connected to each other in the pad area A_PD, and are disposed to be spaced apart from each other in the non-display area except the pad area A_PD.

Figure 3:
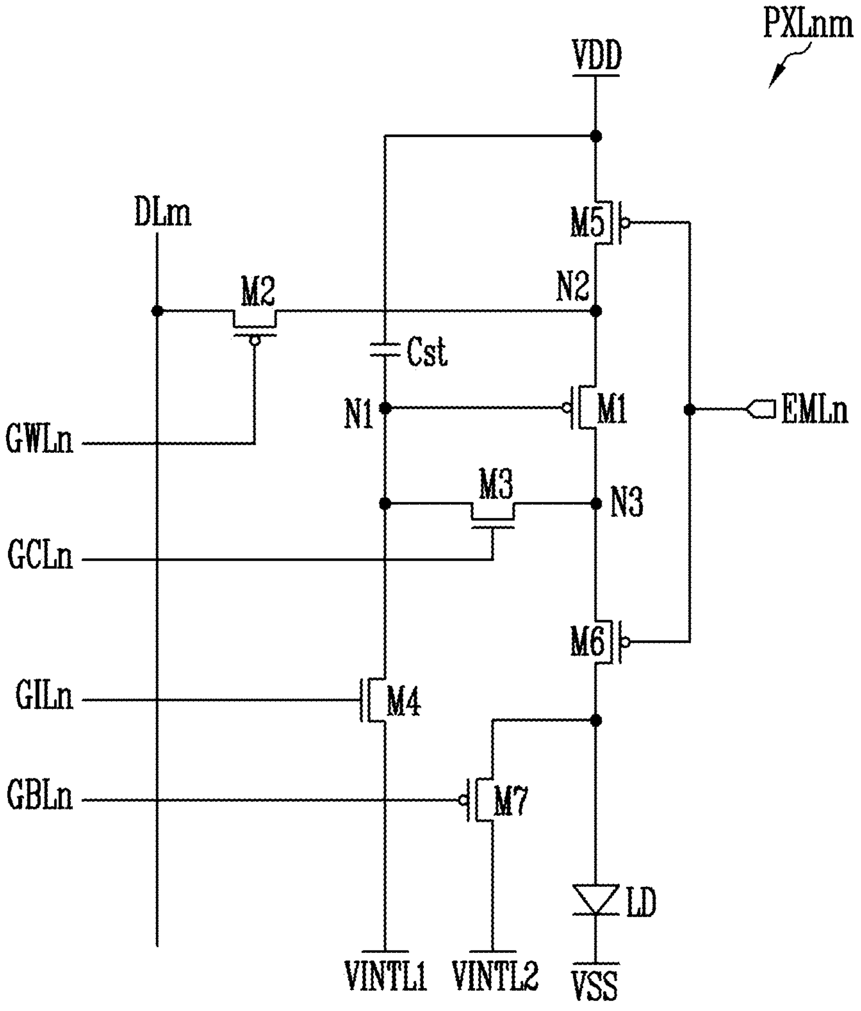
FIG. 3 is a circuit diagram illustrating an embodiment of a pixel included in the display device shown in FIG. 2A.

FIG. 3 is a circuit diagram illustrating an embodiment of the pixel included in the display device shown in FIG. 2A. The pixels included in the display device shown in FIG. 2A are substantially the same as or similar to one another, and therefore, only a pixel PXLnm will hereinafter be described in detail for convenience of description.

Referring to FIG. 3, the pixel PXLnm may include thin film transistors, e.g., first to seventh transistors M1 to M7, a storage capacitor Cst, and a light emitting diode LD (or a light emitting device).

In such an embodiment, a first electrode of a first thin film transistor M1 may be connected to a second node N2, a second electrode of the first thin film transistor M1 may be connected to a third node N3, and a gate electrode of the first thin film transistor M1 may be connected to a first node N1. The first thin film transistor M1 may be referred to as a driving transistor.

The first thin film transistor M1 may control an amount of current flowing from a first power supply line VDD to a second power supply line VSS via the light emitting diode LD, based on a voltage of the first node N1.

A first electrode of a second thin film transistor M2 may be connected to a data line DLm, a second electrode of the second thin film transistor M2 may be connected to the first electrode of the first thin film transistor M1 (or the second node N2), and a gate electrode of the second thin film transistor M2 may be connected to a write gate line GWLn. The second thin film transistor M2 may be referred to as a switching transistor.

The second thin film transistor M2 may be turned on when a write gate signal is supplied to the write gate line GWLn, to electrically connect the data line DLm and the first electrode of the first thin film transistor M1.

A first electrode of a third thin film transistor M3 may be connected to the gate electrode of the first thin film transistor M1 (or the first node N1), a second electrode of the third thin film transistor M3 may be connected to the second electrode of the first thin film transistor M1 (or the third node N3), and a gate electrode of the third thin film transistor M3 may be connected to a compensation gate line GCLn. The third thin film transistor M3 may be referred to as a compensation transistor.

The third thin film transistor M3 may be turned on when a compensate gate signal is supplied to the compensation gate line GCLn, to electrically connect the first node N1 and the third node N3. Therefore, the first thin film transistor M1 may be connected in a diode form when the third thin film transistor M3 is turned on.

A first electrode of a fourth thin film transistor M4 may be connected to the gate electrode of the first thin film transistor M1 (or the first node N1), a second electrode of the fourth thin film transistor M4 may be connected to a first initialization line VINTL1, and a gate electrode of the fourth thin film transistor M4 may be connected to an initialization gate line GILn. The fourth thin film transistor M4 may be referred to as an initialization transistor.

The fourth thin film transistor M4 may be turned on when an initialization gate signal is supplied to the initialization gate line GILn, to connect the first node N1 to the first initialization line VINTL1.

A first electrode of a fifth thin film transistor M5 may be connected to the first power supply line VDD, a second electrode of the fifth thin film transistor M5 may be connected to the first electrode of the first thin film transistor M1 (or the second node N2), and a gate electrode of the fifth thin film transistor M5 may be connected to emission gate line EMLn. The fifth thin film transistor M5 may be referred to as a first emission transistor.

A first electrode of a sixth thin film transistor M6 may be connected to the second electrode of the first thin film transistor M1 (or the third node N3), a second electrode of the sixth thin film transistor M6 may be connected to an anode (or anode electrode) of the light emitting diode LD, and a gate electrode of the sixth thin film transistor M6 may be connected to the emission gate line EMLn. The sixth thin film transistor M6 may be referred to as a second emission transistor.

The fifth thin film transistor M5 and the sixth thin film transistor M6 may be turned off when an emission gate signal having a turn-off level is supplied to the emission gate line EMLn, and be turned on when an emission gate signal having a turn-on level is supplied to the emission gate line EMLn.

A first electrode of a seventh thin film transistor M7 may be connected to the anode of the light emitting diode LD, a second electrode of the seventh thin film transistor M7 may be connected to a second initialization line VINTL2, and a gate electrode of the seventh thin film transistor M7 may be connected to a bypass gate line GBLn. The seventh thin film transistor M7 may be referred to as a bypass transistor.

The seventh thin film transistor M7 may be turned on when a bypass gate signal is supplied to the bypass gate line GBLn, to connect the anode of the light emitting diode LD to the second initialization line VINTL2.

The storage capacitor Cst may be formed or connected between the first power supply line VDD and the gate electrode of the first thin film transistor M1 (or the first node N1). In one embodiment, for example, a first electrode of the storage capacitor Cst may be connected to the first power supply line VDD, and a second electrode of the storage capacitor Cst may be connected to the gate electrode of the first thin film transistor M1. The storage capacitor Cst may store a voltage corresponding to a data voltage and a threshold voltage of the first thin film transistor M1 (e.g., a voltage obtained by reflecting the threshold voltage of the first thin film transistor M1 to the data voltage).

The anode of the light emitting diode LD may be connected to the second electrode of the sixth thin film transistor M6, and a cathode (or cathode electrode) of the light emitting diode LD may be connected to the second power supply line VSS. The light emitting diode LD may generate light with a predetermined luminance corresponding to an amount of current supplied from the first thin film transistor M1.

The light emitting diode LD may be configured as an organic light emitting diode or an inorganic light emitting diode such as a micro light emitting diode or a quantum dot light emitting diode. Also, the light emitting diode LD may be a light emitting diode including of made of a combination of an organic material and an inorganic material. In an embodiment, as shown in FIG. 3, the pixel PXLnm may include a single light emitting diode LD, but not being limited thereto. In an alternative embodiment, the pixel PXLnm may include a plurality of light emitting diodes, and the plurality of light emitting diodes may be connected in parallel to each other or be connected in series to each other.

A voltage applied to the first power supply line VDD may be set higher than those applied to the first initialization line VINTL1, the second initialization line VINTL2, and the second power supply line VSS.

The first, second, fifth, sixth, and seventh thin film transistors M1, M2, M5, M6, and M7 may be implemented as a P-type transistor. Channels of the first, second, fifth, sixth, and seventh thin film transistors M1, M2, M5, M6, and M7 may include or be configured with poly-silicon. A poly-silicon transistor may be a low temperature poly-silicon ("LTPS") transistor. The poly-silicon transistor has high electron mobility, and has a fast driving characteristic according to the high electron mobility.

The third and fourth thin film transistors M3 and M4 may be implemented with an N-type transistor. Channels of the third and fourth thin film transistors M3 and M4 may include or be configured with an oxide semiconductor. The oxide semiconductor transistor has a charge mobility lower than that of the poly-silicon transistor. Therefore, oxide semiconductor transistors may have an amount of leakage current generated in a turn-off state, which is smaller than that of poly-silicon transistors.

Figure 4:
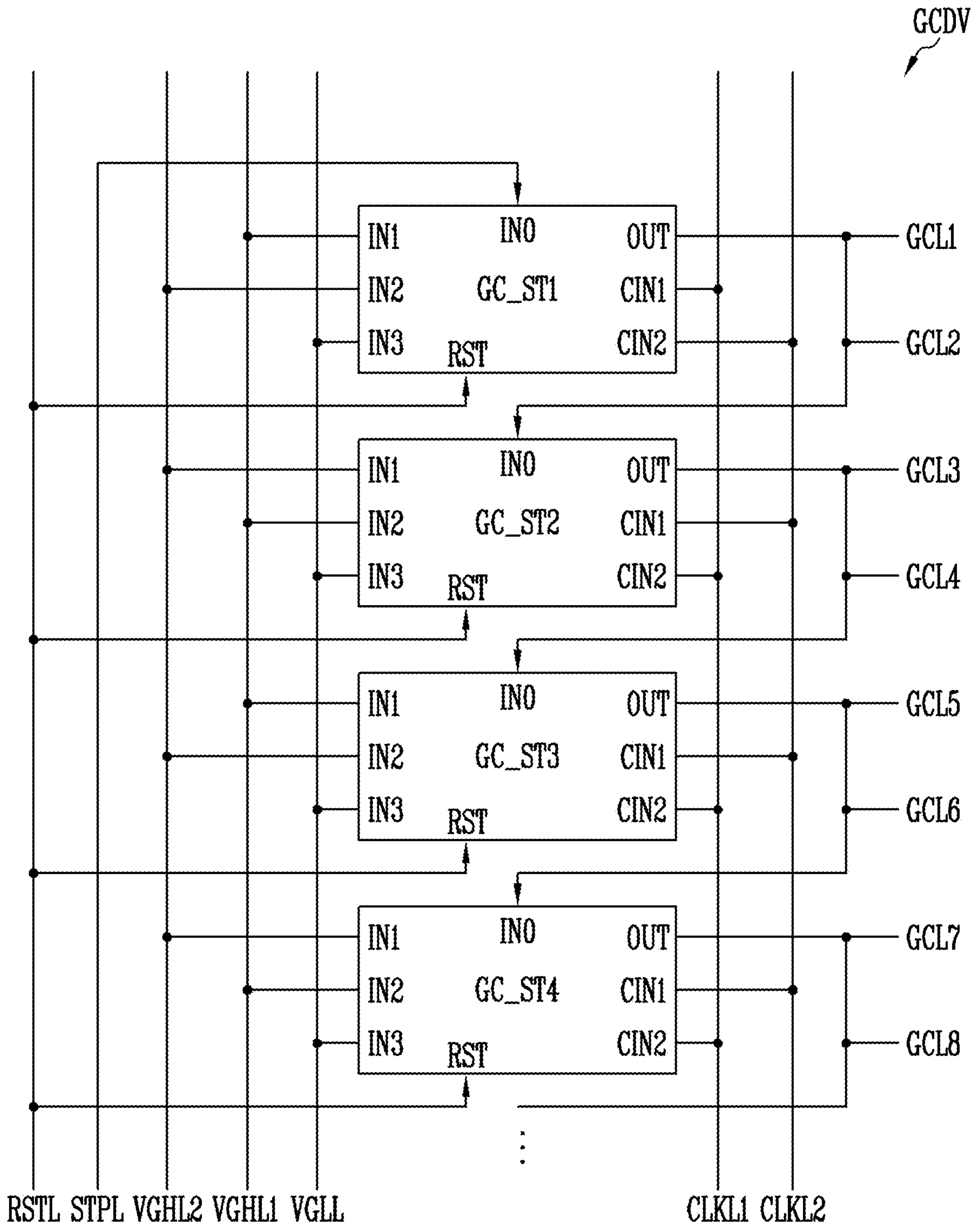
FIG. 4 is a diagram illustrating an embodiment of a compensation gate driver included in the display device shown in FIGS. 2A and 2B.

FIG. 4 is a diagram illustrating an embodiment of the compensation gate driver included in the display device shown in FIGS. 2A and 2B.

Referring to FIGS. 2A and 4, an embodiment of the compensation gate driver GCDV may include a plurality of compensation stages GC_ST1, GC_ST2, GC_ST3, and GC_ST4 (or stages). For convenience of illustration and description, only a portion of the compensation gate driver GCDV is schematically illustrated in FIG. 4.

Each of the compensation stages GC_ST1, GC_ST2, GC_ST3, and GC_ST4 may include an input terminal IN0, a first power input terminal IN1, a second power input terminal IN2, a third power input terminal IN3, a first clock input terminal CIN1, a second clock input terminal CIN2, a reset terminal RST, and an output terminal OUT. As will be described later with reference to FIG. 5, internal circuit configurations of the compensation stages GC_ST1, GC_ST2, GC_ST3, and GC_ST4 may be substantially to the same as one another.

Each of the compensation stages GC_ST1, GC_ST2, GC_ST3, and GC_ST4 may be connected to a first gate power line VGHL1, a second gate power line VGHL2, a reference gate power line VGLL, clock signal lines CLKL1 and CLKL2, and a reset signal line RSTL. A reference gate power voltage may be applied to the reference gate power line VGLL from the power supply PS (see FIG. 1). The reference gate power voltage may have a voltage level (e.g., a logic low level) lower than that (e.g., a logic high level) of a gate power voltage applied to the first and second gate power lines VGHL1 and VGHL2. Clock signals (or compensation clock signals) may be applied to the clock signal lines CLKL1 and CLKL2 from the timing controller TC (see FIG. 1). As will be described later with reference to FIG. 7B, a second clock signal (or second compensation clock signal) applied to a second clock signal line CLKL2 may have a phase reversed or delayed by 180 degrees from that of a first clock signal (or first compensation clock signal) applied to a first clock signal line CLKL1. A reset signal may be applied to the reset signal line RSTL from the timing controller TC (see FIG. 1), in power-on and/or power-off of the display device DD (see FIG. 1). In such an embodiment, a start signal (e.g., a compensation start signal or a compensation start pulse) may be applied to a start signal line STPL from the timing controller TC (see FIG. 1).

In an embodiment, as shown in FIG. 4, in odd-numbered compensation stages GC_ST1 and GC_ST3, the first power input terminal IN1 may be connected to the first gate power line VGHL1, the second power input terminal IN2 may be connected to the second gate power line VGHL2, the third power input terminal IN3 may be connected to the reference gate power line VGLL, the first clock input terminal CIN1 may be connected to the first clock signal line CLKL1, the second clock input terminal CIN2 may be connected to the second clock signal line CLKL2, and the reset terminal RST may be connected to the reset signal line RSTL.

In such an embodiment, in even-numbered compensation stages GC_ST2 and GC_ST4, the first power input terminal IN1 may be connected to the second gate power line VGHL2, the second power input terminal IN2 may be connected to the first gate power line VGHL1, the third power input terminal IN3 may be connected to the reference gate power line VGLL, the first clock input terminal CIN1 may be connected to the second clock signal line CLKL2, the second clock input terminal CIN2 may be connected to the first clock signal line CLKL1, and the reset terminal RST may be connected to the reset signal line RSTL.

In each of the compensation stages GC_ST1, GC_ST2, GC_ST3, and GC_ST4, a gate power voltage applied to the second power input terminal IN2 may be used to control a voltage of an internal node, and a gate power voltage applied to the first power input terminal IN1 may be used to output a compensation gate signal (or output as a compensation gate signal). In such an embodiment, a gate power voltage for controlling a voltage of an internal node and a gate power voltage for generating a compensation gate signal may be independently provided to each of the compensation stages GC_ST1, GC_ST2, GC_ST3, and GC_ST4. In such an embodiment, the first gate power line VGHL1 and the second gate power line VGHL2, which are used to transfer a gate power voltage to the compensation stages GC_ST1, GC_ST2, GC_ST3, and GC_ST4, are connected to each other in the pad area A_PD, such that influence of a voltage drop on another gate power line is reduced since a path for the voltage drop is lengthened. Thus, a fluctuation of the gate power voltage for controlling the voltage of the internal node has no influence on the gate power voltage for generating the compensation gate signal and the compensation gate signal, and a ripple of the compensation gate signal may be effectively reduced.

In such an embodiment, a connection order of the odd-numbered compensation stages GC_ST1 and GC_ST3 to the first and second gate power lines VGHL1 and VGHL2 may be opposite to that of the even-numbered compensation stages GC_ST2 and GC_ST4 to the first and second gate power lines VGHL1 and VGHL2. In such an embodiment, when a compensation gate signal is generated, the odd-numbered compensation stages GC_ST1 and GC_ST3 may use a gate power voltage (i.e., a first gate power voltage applied to the first gate power line VGHL1) different from a gate power voltage (i.e., a second gate power voltage applied to the second gate power line VGHL2) of the even-numbered compensation stages GC_ST2 and GC_ST4. Thus, even when a fluctuation occurs in a compensation gate signal of a previous compensation stage, the fluctuation has no influence on a gate power voltage of a subsequent compensation stage and a subsequent compensation gate signal, and a ripple of compensation gate signals can be reduced.

Each of the compensation stages GC_ST1, GC_ST2, GC_ST3, and GC_ST4 may be connected to the start signal line STPL or the output terminal of a previous compensation stage, and receives a start signal provided through the start signal line STPL or a previous compensation gate signal corresponding to a compensation gate signal of the previous compensation stage.

In one embodiment, for example, the input terminal IN0 of a first compensation stage GC_ST1 may be connected to the start signal line STPL. The first compensation stage GC_ST1 may generate a compensation gate signal corresponding to the start signal applied to the start signal line STPL (e.g., delayed by a half period of a clock signal from the start signal). In one embodiment, for example, the input terminal IN0 of a second compensation stage GC_ST2 may be connected to the output terminal of the first compensation stage GC_ST1 (or a first compensation gate line GCL1). The second compensation sage GC_ST2 may generate a second compensation gate signal corresponding to the first compensation gate signal (e.g., delayed by a half period of the clock signal from the first compensation gate signal). In such an embodiment, the input terminal IN0 of a third compensation stage GC_ST3 may be connected to the output terminal OUT of the second compensation stage GC_ST2 (or a third compensation gate line GCL3). The input terminal IN0 of a fourth compensation stage GC_ST4 may be connected to the output terminal OUT of the third compensation stage GC_ST3 (or a fifth compensation gate line GCL5).

In such an embodiment, the compensation stages GC_ST1, GC_ST2, GC_ST3, and GC_ST4 may sequentially generate compensation gate signals corresponding to the start signal.

In an embodiment, each of the compensation stages GC_ST1, GC_ST2, GC_ST3, and GC_ST4 may be connected to two compensation gate lines among compensation gate lines GCL1, GCL2, GCL3, GCL4, GCL5, GCL6, GCL7, and GCL8, and the two compensation gate lines may simultaneously output a compensation gate signal.

In one embodiment, for example, the output terminal OUT of the first compensation stage GC_ST1 may be connected to the first compensation gate line GCL1 and a second compensation gate line GCL2. The output terminal OUT of the second compensation stage GC_ST2 may be connected to the third compensation gate line GCL3 and a fourth compensation gate line GCL4. The output terminal OUT of the third compensation stage GC-ST3 may be connected to the fifth compensation gate line GCL5 and a sixth compensation gate line GCL6. The output terminal OUT of the fourth compensation stage GC_ST4 may be connected to a seventh compensation gate line GCL7 and an eighth compensation gate line GCL8. The compensation gate driver GCDV may output a compensation gate signal for every second gate lines. In such an embodiment, as compared with a case where each of the compensation stages GC_ST1, GC_ST2, GC_ST3, and GC_ST4 is connected only to a single gate line, the driving frequency of the compensation gate driver GCDV may be decreased, and the power consumption of the compensation gate driver GCDV may be reduced.

In an embodiment, as shown in FIG. 4, each of the compensation stages GC_ST1, GC_ST2, GC_ST3, and GC_ST4 are connected to two compensation gate lines, but the disclosure is not limited thereto. In one alternative embodiment, for example, each of the compensation stages GC_ST1, GC_ST2, GC_ST3, and GC_ST4 may be connected to three or more compensation gate lines, and thus the power consumption of the compensate gate driver GCDV may be further reduced.

In an embodiment, as described above with reference to FIG. 4, the compensation gate driver GCDV includes the compensation stages GC_ST1, GC_ST2, GC_ST3, and GC_ST4, and the gate power voltage for controlling the voltage of the internal node and the gate power voltage for generating the compensation gate signal are independently provided to the compensation stages GC_ST1, GC_ST2, GC_ST3, and GC_ST4 through the first and second gate power lines VGHL1 and VGHL2. In such an embodiment, when the compensation gate signal is generated, the odd-numbered compensation stages GC_ST1 and GC_ST3 use a gate power voltage (i.e., the first gate power voltage applied to the first gate power line VGHL1) different from the gate power voltage (i.e., the second gate power voltage applied to the second gate power line VGHL2) of the even-numbered compensation stages GC_ST2 and GC_ST4. Thus, a fluctuation of the gate power voltage for controlling the voltage of the internal node and a ripple of compensation gate signals due to a fluctuation of a previous compensation gate signal may be reduced.

Figure 5:
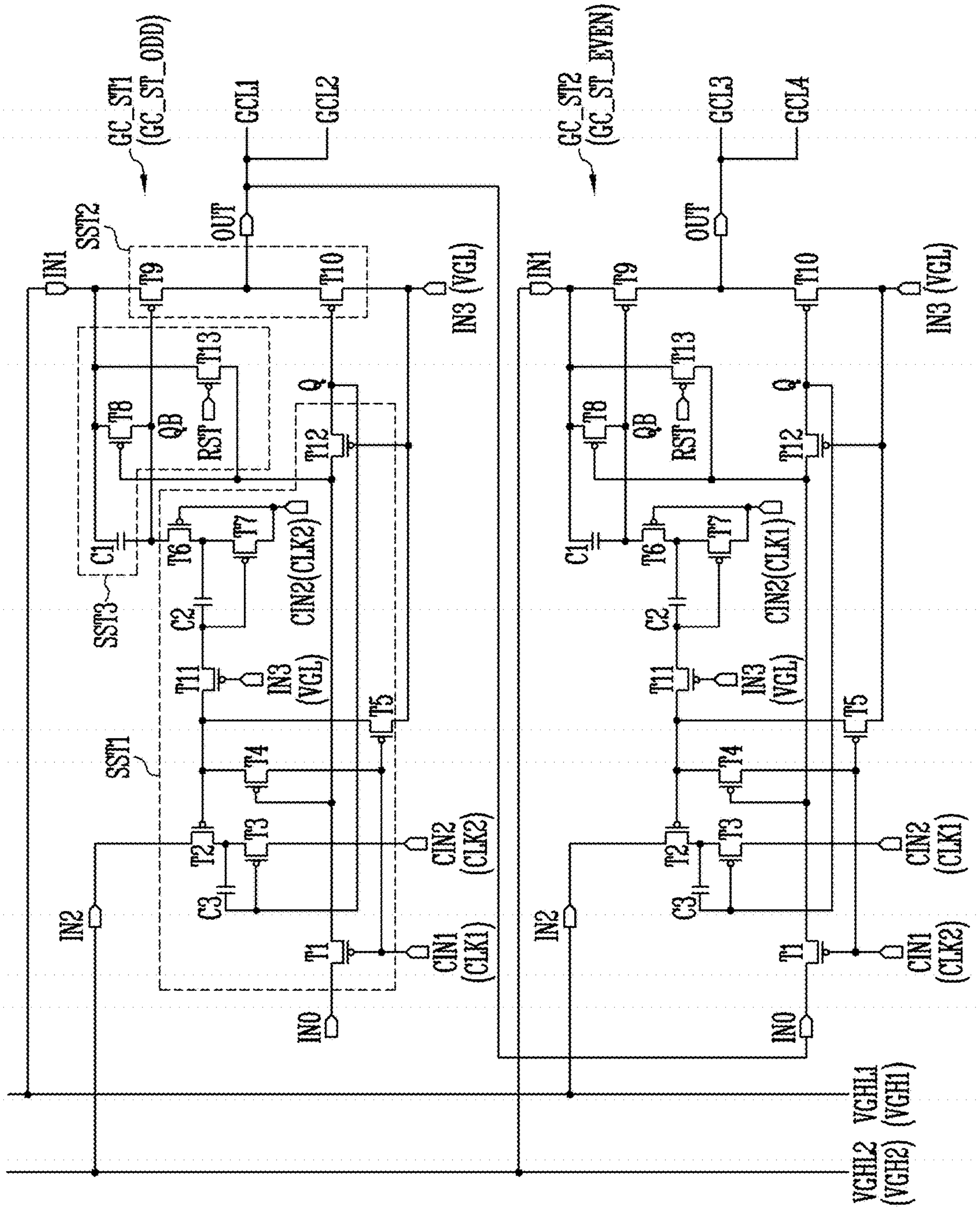
FIG. 5 is a circuit diagram illustrating an embodiment of a first compensation stage and a second compensation stage, which are included in the compensation gate driver shown in FIG. 4.

FIG. 5 is a circuit diagram illustrating an embodiment of the first compensation stage and the second compensation stage, which are included in the compensation gate driver shown in FIG. 4. Each of the odd-numbered compensation stages GC_ST1 and GC_ST3 described with reference to FIG. 4 may be substantially to the same as the first compensation stage GC_ST1, and each of the even-numbered compensation stages GC_ST2 and GC_ST4 described with reference to FIG. 4 may be substantially to the same as the second compensation stage GC_ST2. Therefore, the first compensation stage GC_ST1 and the second compensation stage GC_ST2 will hereinafter be described in detail, and any repetitive detailed description of other compensation stages will be omitted.

Referring to FIGS. 4 and 5, in the first compensation stage GC_ST1, the first power input terminal IN1 may be connected to the first gate power line VGHL, the second power input terminal IN2 may be connected to the second gate power line VGHL2, the third power input terminal IN3 may be connected to the reference gate power line VGLL, the first clock input terminal CIN1 may be connected to the first clock signal line CLKL1, the second clock input terminal CIN2 may be connected to the second clock signal line CLKL2, and the reset terminal RST may be connected to the reset signal line RSTL. A first gate power voltage VGH1 may be applied to the first gate power line VGHL1, a second gate power voltage VGH2 may be applied to the second gate power line VGHL2, a reference gate power voltage VGL may be applied to the reference gate power line VGLL (and the third power input terminal IN3), a first clock signal CLK1 may be applied to the first clock signal line CLKL1 (and the first clock input terminal CIN1), and a second clock signal CLK2 may be applied to the second clock signal line CLKL2 (and the second clock input terminal CIN2). The input terminal IN0 may be connected to the start signal line STPL. A gate power voltage equal to the first gate power voltage VGH1 may be applied to the first gate power line VGHL1. For convenience of description, a gate power voltage in the first gate power line VGHL1 will be referred to as the first gate power voltage VGH1, and a gate power voltage in the second gate power line VGHL2 will be referred to as the second gate power voltage VGH2. In one embodiment, for example, the first gate power voltage VGH1 and the second gate power voltage VGH2 may be in a range of about 4 volts (VO to about 10 V, and the reference gate power voltage VGL may be in a range of about-4 V to about-10 V.

In an embodiment, as shown in FIG. 5, the first compensation stage GC_ST1 (or an odd-numbered compensation stage GC_ST_ODD) may include a node controller SST1, an output unit SST2 (or a buffer unit), and a node maintenance unit SST3.

In such an embodiment, the output unit SST2 may be connected to the first power input terminal IN1 and the third power input terminal IN3. The output unit SST2 may output the first gate power voltage VGH1 as a first compensation gate signal to the output terminal OUT, based on a voltage of a second control node Q and a voltage of a first control node QB.

The output unit SST2 may include a ninth transistor T9 (or a pull-up transistor) and a tenth transistor T10 (or a pull-down transistor).

The ninth transistor T9 may include a first electrode connected to the first power input terminal IN1, a second electrode connected to the output terminal OUT, and a gate electrode connected to the first control node QB.

The tenth transistor T10 may include a first electrode connected to the output terminal OUT, a second electrode connected to the third power input terminal IN3, and a gate electrode connected to the second control node Q.

The node controller SST1 may be connected to the input terminal IN0, the second power input terminal IN2, the third power input terminal IN3, the first clock input terminal CIN1, and the second clock input terminal CIN2. The node controller SST1 may control the voltage of the first control node QB and the voltage of the second control node Q based on a start signal (or previous compensation gate signal) provided through the input terminal IN0 and the second gate power voltage VGH2 provided through the second power input terminal IN2.

The node controller SST1 may include first, second, third, fourth, fifth, sixth, seventh, eleventh, and twelfth transistors T1, T2, T3, T4, T5, T6, T7, T11, and T12, a second capacitor C2 (or a coupling capacitor), and a third capacitor C3.

The first transistor T1 (or a zeroth transistor) may include a first electrode connected to the input terminal IN0, a second electrode connected to a first electrode of the twelfth transistor T12, and a gate electrode connected to the first clock input terminal CIN1.

The second transistor T2 may include a first electrode connected to the second power input terminal IN2, a second electrode connected to a first electrode of the third transistor T3, and a gate electrode connected to a first electrode of the eleventh transistor T11.

The third transistor T3 may include the first electrode connected to the second electrode of the second transistor T2, a second electrode connected to the second clock input terminal CIN2, and a gate electrode connected to the second control node Q.

The third capacitor C3 may be connected or formed between the second electrode of the second transistor T2 and the second control node Q, and include a first electrode connected to the second electrode of the second transistor T2 and a second electrode connected to the second control node Q.

The fourth transistor T4 may include a first electrode connected to the gate electrode of the second transistor T2, a second electrode connected to the first clock input line CIN1, and a gate electrode connected to the second electrode of the first transistor T1.

The fifth transistor T5 may include a first electrode connected to the gate electrode of the second transistor T2, a second electrode connected to the third power input terminal IN3, and a gate electrode connected to the first clock input terminal CIN1.

The sixth transistor T6 may include a first electrode connected to the first control node QB, a second electrode connected to a first electrode of the seventh transistor T7, and a gate electrode connected to the second clock input terminal CIN2.

The seventh transistor T7 may include the first electrode connected to the second electrode of the sixth transistor T6, a second electrode connected to the second clock input terminal CIN2, and a gate electrode connected to a second electrode of the eleventh transistor T11.

The second capacitor C2 (or the coupling capacitor) may be connected or formed between the second electrode of the eleventh transistor T11 and the second electrode of the sixth transistor T6, and include a first electrode connected to the second electrode of the eleventh transistor T11 and a second electrode connected to the second electrode of the sixth transistor T6.

The eleventh transistor T11 (or a first coupling transistor) may include the first electrode connected to the gate electrode of the second transistor T2, the second electrode connected to the first electrode of the second capacitor C2, and a gate electrode connected to the third power input terminal IN3.

The twelfth transistor T12 (or a second coupling transistor) may include the first electrode connected to the second electrode of the first transistor T1, a second electrode connected to the second control node Q, and a gate electrode connected to the third power input terminal IN3.

The node maintenance unit SST3 may substantially constantly maintain the voltage of the first control node QB in response to the voltage of the second control node Q. The node maintenance unit SST3 may include a first capacitor C1, an eighth transistor T8, and a thirteenth transistor T13.

The first capacitor C1 may be connected or formed between the first power input terminal IN1 and the first control node QB, and include a first electrode connected to the first power input terminal IN1 and a second electrode connected to the first control node QB. The first capacitor C1 may substantially constantly maintain a voltage difference between the first power input terminal IN1 and the first control node QB.

The eighth transistor T8 may include a first electrode connected to the first power input terminal IN1, a second electrode connected to the first control node QB, and a gate electrode connected to the second electrode of the first transistor T1. The eighth transistor T8 may constantly maintain the voltage of the first control node QB in response to a voltage at the second electrode of the first transistor T1

(i.e., the voltage of the second control node Q). In one embodiment, for example, when the voltage of the second control node Q has a logic low level, the eighth transistor T8 may maintain the voltage of the first control node QB to have a logic high level by using the first gate power voltage VGH1.

The thirteenth transistor T13 (or a reset transistor) may include a first electrode connected to the first power input terminal IN1, a second electrode connected to the second electrode of the first transistor T1, and a gate electrode connected to the reset terminal RST. When the display device DD (see FIG. 1) is turned on or turned off, a reset signal having a logic low level may be applied to the reset terminal RST. The thirteenth transistor T13 may be turned on in response to the reset signal having the logic low level, and a reset operation may be performed such that the voltage at the second electrode of the first transistor (and the second control node Q) has the first gate power voltage VGH1.

In an embodiment, as shown in FIG. 5, the first to thirteenth transistors T1 to T13 may be implemented with a P-type transistor. In an embodiment, the first to thirteenth transistors T1 to T13 may implemented with a single gate transistor as illustrated in FIG. 5, but the disclosure is not limited thereto. In one alternative embodiment, for example, at least one of the first to thirteenth transistors T1 to T13 may be implemented with a dual gate transistor (i.e., a dual gate transistor configured with two transistors which are connected in series to each other and include gate electrodes connected to each other) to improve reliability.

The second compensation stage GC_ST2 (or an even-numbered stage GC_ST_EVEN) may be substantially the same as or similar to the first compensation stage GC_ST1. Therefore, any repetitive detailed descriptions of the same or like elements thereof will not be repeated.

In the second compensation stage GC_ST2, the first power input terminal IN1 may be connected to the second gate power line VGHL2, the second power input terminal IN2 may be connected to the first gate power line VGHL1, the third power input terminal IN3 may be connected to the reference gate power line VGLL, the first clock input terminal CIN1 may be connected to the second clock signal line CLKL2, the second clock input terminal CIN2 may be connected to the first clock signal line CLKL1, and the reset terminal RST may be connected to the reset signal line RSTL.

Operations of the first compensation stage GC_ST1 and the second compensation stage GC_ST2 will hereinafter be described with reference to FIGS. 5 and 6.

Figure 6:
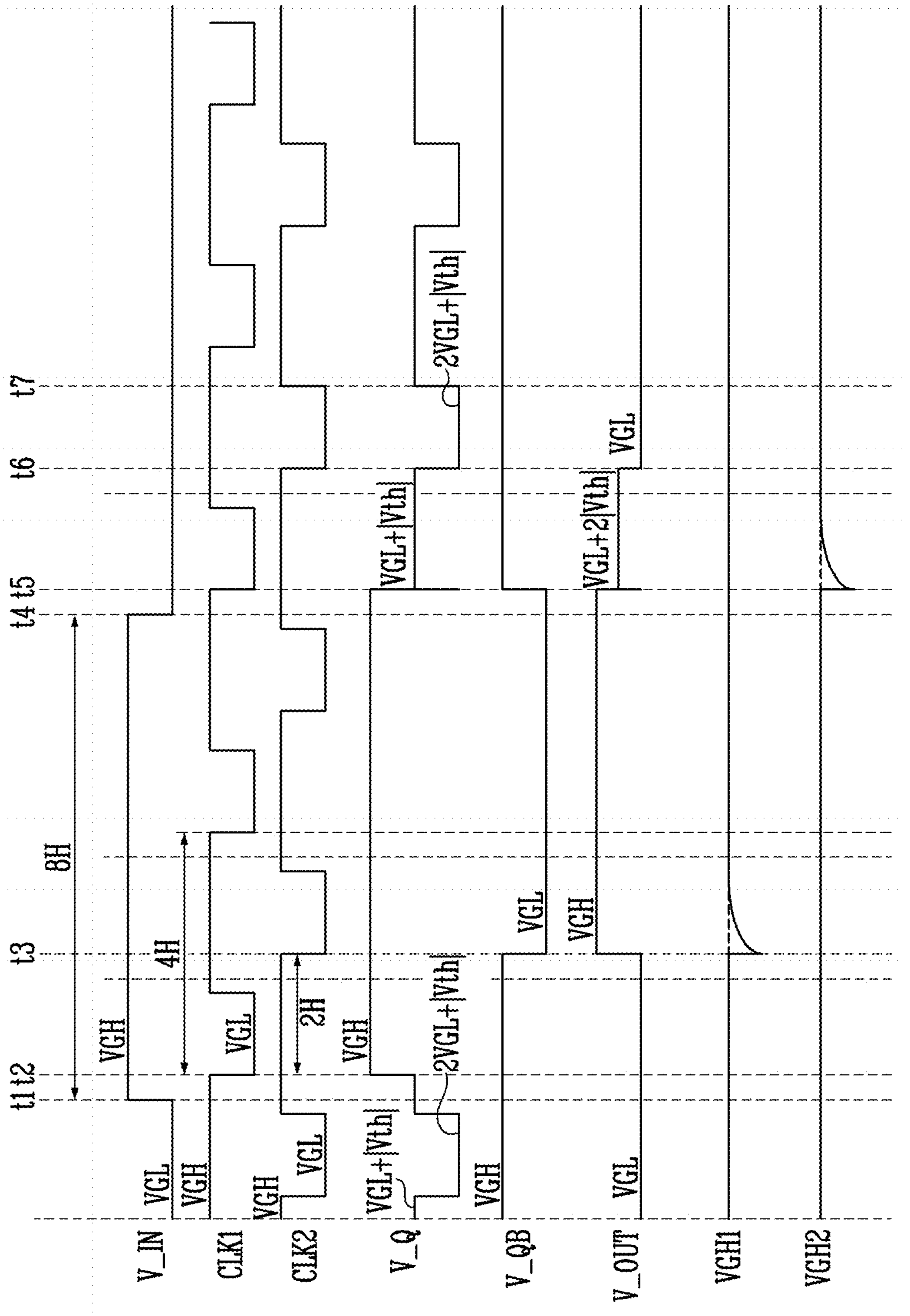
FIG. 6 is a waveform diagram illustrating an embodiment of signals in the first compensation stage shown in FIG. 5.

FIG. 6 is a waveform diagram illustrating an embodiment of signals in the first compensation stage shown in FIG. 5. Operations of the first compensation stage GC_ST1 and the second compensation stage GC_ST2 are substantially the same as or similar to each other, and therefore, an operation of the first compensation stage GC_ST1 will be described, and any repetitive detailed description of the operation of the second compensation stage GC_ST2 will be omitted for convenience of description.

Referring to FIGS. 5 and 6, the first clock signal CLK1 applied to the first clock input terminal CIN1 may have a first logic low level a logic high level during four horizontal periods 4H as a period. The first logic low level may correspond to a gate-on voltage level at which P-type transistors are turned on, and be equal to a voltage level of the reference gate power voltage VGL. The logic high level may correspond to a gate-off voltage level at which the P-type transistors are turned off, and be equal to a voltage level of the gate power voltage VGH (e.g., the first gate power voltage VGH1 or the second gate power voltage VGH2).

The second clock signal CLK2 applied to the second clock input terminal CIN2 may have a waveform delayed by a half period (i.e., two horizontal periods 2H) from that of the first clock signal CLK1.

At a first time point t1, an input voltage V_IN (e.g., a start signal) at the input terminal IN0 may be changed from the first low logic level to the logic high level. In one embodiment, for example, the input voltage V_IN may be maintained with the logic high level for 8 horizontal periods 8H.

At the first time point t1, a second node voltage V_Q at the second control node Q may have a second logic low level, the second node voltage V_Q at the first control node QB may have the logic high level, and an output voltage V_OUT (i.e., a first compensation gate signal) at the output terminal OUT may have the logic low level. The second logic low level may have a voltage level similar to that of the first logic low level. In one embodiment, for example, the second logic low level may have a voltage level higher by a threshold voltage Vth of a transistor than that of the reference gate power voltage VGL (i.e., VGL+|Vth|).

At a second time point t2, the first clock signal CLK1 may be changed from the logic high level to the first logic low level.

Accordingly, the first transistor T1 may be turned on in response to the first clock signal CLK1 having the first low level, and the input voltage V_IN having the logic high level may be applied to the first electrode of the twelfth transistor T12. Since the twelfth transistor T12 is in a state in which the twelfth transistor T12 is turned on by the reference gate power voltage VGL, the input voltage V_IN having the logic high level may be applied to the second control node Q through the twelfth transistor T12. That is, the second node voltage V_Q may be changed to have the logic high level at the second time point t2.

In addition, the fifth transistor T5 may be turned on in response to the first clock signal CLK1 having the first logic low level, and the reference gate power voltage VGL may be applied to the first electrode of the eleventh transistor T11. Since the eleventh transistor T11 is in a state in which the eleventh transistor T11 is turned on by the reference gate power voltage VGL, the reference gate power voltage VGL may be applied to the first electrode of the second capacitor C2. The seventh transistor T7 may be turned on in response to the reference gate power voltage VGL (i.e., the reference gate power voltage VGL applied to the first electrode of the second capacitor C2), and the second clock signal CLK2 having the logic high level may be applied to the second electrode of the second capacitor C2. Therefore, a voltage corresponding to a difference between the logic high level and the first logic low level may be charged in the second capacitor C2.

The second transistor T2 may be turned on in response to the reference gate power voltage VGL, and the second gate power voltage VGH2 may be applied to the second electrode of the third capacitor C3. Since the first electrode of the third capacitor C3 may be connected to the second control node Q, and the second node voltage V_Q has the logic high level, the third capacitor C3 may be discharged.

At a third time point t3, the second clock signal CLK2 may be changed from the logic high level to the first logic low level.

The sixth transistor T6 may be turned on in response to the second clock signal CLK2 having the first logic low level, and the second clock signal CLK2 having the first logic low level may be applied to the first control node QB through the seventh transistor which in a turn-on state by the second capacitor C2 and the turned-on sixth transistor T6. That is, a first node voltage V_QB may be changed to have the first logic low level at the third time point t3.

The ninth transistor T9 may be turned on in response to the first node voltage V_QB having the first logic low level, and the first gate power voltage VGH may be applied to the output terminal OUT through the first input terminal IN1 and the ninth transistor T9. That is, the output voltage V_OUT may be changed to have the logic high level at the third time point t3.

As shown in FIG. 5, the output voltage V_OUT (i.e., the first compensation gate signal) of the first compensation stage GC_ST1 may be applied to the first compensation gate line GCL1 and the second compensation gate line GCL2, and a temporary drop may occur in the first gate power voltage VGH1 by a load of the first compensation gate line GCL1 and the second compensation gate line GCL2 (e.g., to charge capacitors of the first compensation gate line GCL1 and the second compensation gate line GCL2).

Subsequently, although the first control node QB is in a floating state due to a change of the first clock signal CLK1 and the second clock signal CLK2, the first node voltage V_QB may maintain with the first logic low level by the first capacitor C1, and the output voltage V_OUT may be maintained with a logic high level.

At a fourth time point t4, the input voltage V_IN may be changed from the logic high level to the first logic low level.

At a fifth time point t5, the first clock signal CLK1 may be changed from the logic high level to the first logic low level.

The first transistor T1 may be turned on in response to the first clock signal CLK1 having the first logic low level, and the input voltage V_IN having the first logic low level may be applied to the first electrode of the twelfth transistor T12. Since the twelfth transistor T12 is in a state in which the twelfth transistor T12 is turned on by the reference gate power voltage VGL, the input voltage V_IN having the first logic low level may be applied to the second control node Q through the twelfth transistor T12. The second node voltage V_Q may be changed to have the second logic low level (i.e., VGL+|Vth|), by a threshold voltage of the twelfth transistor T12.

The tenth transistor T10 may be turned on in response to the second node voltage V_Q having the second logic low level, and the reference gate power voltage VGL may be applied to the output terminal OUT. The output voltage V_OUT may be changed to have a fourth voltage level (i.e., VGL+2|Vth|), by the second node voltage V_Q having the second logic low level and a threshold voltage of the tenth transistor T10.

At the fourth time point t4, the fourth transistor T4 may be turned on by the input voltage V_IN having the first logic low level, which is provided through the first transistor T1. In addition, the fifth transistor T5 may be turned on in response to the first clock signal CLK1 having the first logic low level at the fifth time point t5, and the reference gate power voltage VGL (and the first clock signal CLK1) may be applied to the gate electrode of the second transistor T2.

The second transistor T2 may be turned on in response to the reference gate power voltage VGL, and the second gate power voltage VGH2 may be applied to the second electrode of the third transistor T3. Since the first electrode of the third capacitor C3 is connected to the second control node Q, the second node voltage V_Q having the second logic low level may be applied to the first electrode of the third capacitor C3. Since a voltage difference occurs between both ends of the third capacitor C3, the third capacitor C3 may be charged by the second gate power voltage VGH2 provided through the second transistor T2. In such an embodiment, a temporary drop may occur in the second gate power voltage VGH2 to charge the third capacitor C3. In such an embodiment, a drop may occur in the second gate power voltage VGH2 due to a coupling error of the third capacitor C3.

At the fifth time point t4, the eighth transistor T8 may be turned on by the input voltage V_IN having the first logic low level, and the first gate power voltage VGH1 may be applied to the first control node QB. That is, the first node voltage V_QB may be changed to have the logic high level.

At a sixth time point t6, the second clock signal CLK2 may be changed from the logic high level to the first logic low level.

Since the third transistor T3 is in a state in which the third transistor T3 is turned on by the second node voltage V_Q, the second clock signal CLK2 having the first logic low level may be applied to the second electrode of the third capacitor C3. The second node voltage V_Q may be boosted by the third capacitor C3, and be changed to have a third logic low level. In addition, the output voltage V_OUT may be changed to have the first logic low level, corresponding to the second node voltage V_Q having the third logic low level. The third logic low level may have a voltage level lower than that of the first logic low level. In one embodiment, for example, the third logic low level may have a voltage level by the reference gate power voltage VGL than that of the second logic low level (i.e., 2VGL+|Vth|).

At a seventh time point t7, the second clock signal CLK2 may be changed from the first logic low level to the logic high level.

The second clock signal CLK2 having the logic high level may be applied to the second electrode of the third capacitor C3 through the third transistor T3. The second node voltage V_Q may be changed to have the fourth voltage level (i.e., VGL+2|Vth|), by the third capacitor C3.

In an embodiment, as described with reference to FIGS. 5 and 6, the first compensation stage GC_ST1 may output the first gate power voltage VGH as the output voltage V_OUT (i.e., the first compensation gate signal), corresponding to a waveform delayed by a half period of the second clock signal CLK2 from that of the input voltage V_IN (i.e., the start signal).

In such an embodiment, the first gate power voltage VGH1 may be temporarily dropped at the third time point t3 (i.e., a time at which the output voltage V_OUT is changed to the logic high level), and the second gate power voltage VGH2 may be temporarily dropped at the fifth time point t5 (i.e., the first clock signal CLK1 is changed from the logic high level to the first logic low level in a state in which the output voltage V_OUT has the logic low level). In such an embodiment, the first gate power line VGHL1 and the second gate power line VGHL2 are in a state in which the first gate power line VGHL1 and the second gate power line VGHL2 are separated from each other in the compensate gate circuit area A_GCDV (see FIG. 2A), such that a number of times (i.e., a ripple) the first gate power voltage VGH1 and the second gate power voltage VGH2 are dropped may be relatively decreased, and a luminance difference due to the ripple may be reduced.

The decrease in the number of times (i.e., the ripple) the first gate power voltage VGH1 and the second gate power voltage VGH2 are dropped will be described in greater detail with reference to FIGS. 7A, 7B, and 8.

Figure 7A:
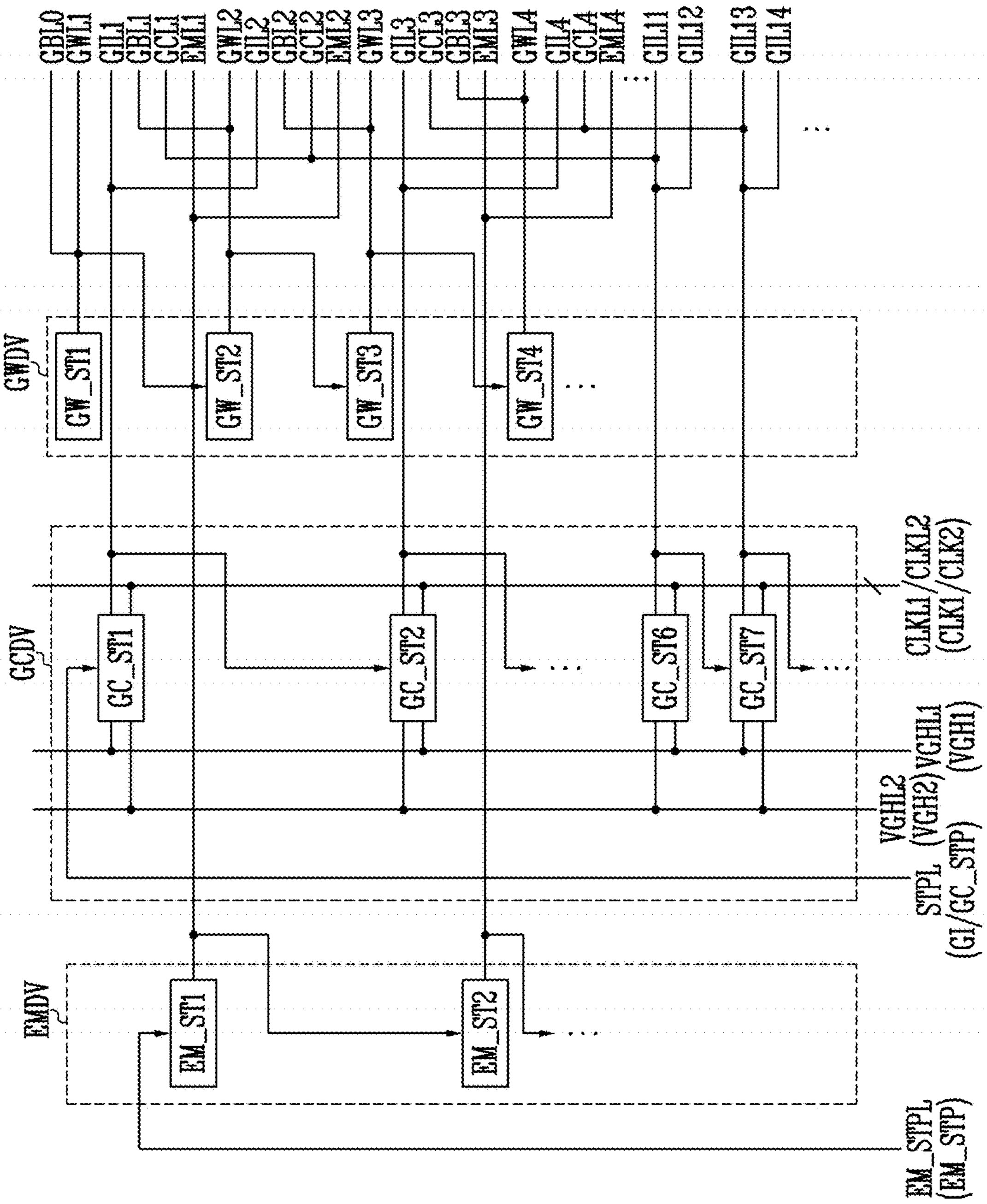
FIG. 7A is a diagram illustrating an embodiment of a gate driver included in the display device shown in FIG. 2A.

FIG. 7A is a diagram illustrating an embodiment of the gate driver included in the display device shown in FIG. 2A. FIG. 7B is a waveform diagram illustrating an embodiment of signals in the gate driver shown in FIG. 7A.

Referring to FIGS. 2A, 5, 7A, and 7B, an embodiment of the gate driver GDV may include a write gate driver GWDV, a compensation gate driver GCDV, and an emission driver EMDV. The write gate driver GWDV may include write stages GW_ST1, GW_ST2, GW_ST3, and GW_ST4, and each of the write stages GW_ST1, GW_ST2, GW_ST3, and GW_ST4 may be connected to one of bypass gate lines GBL0, GBL1, GBL2, and GBL3 and one of write gate lines GWL1, GWL2, GWL3, and GWL4. The compensation gate driver GCDV may include compensation stages GC_ST1, GC_ST2, . . . , GC_ST6, and GC_ST7, and each of the compensation stages GC_ST1, GC_ST2, . . . , GC_ST6, and GC_ST7 may be connected to two of initialization gate lines GIL1, GIL2, GIL3, GIL4, . . . , GIL11, GIL12, GIL13, and GIL14 or two of compensation gate lines GCL1, GCL2, GCL3, and GCL4. Each of the compensation stages GC_ST1, GC_ST2, . . . , GC_ST6, and GC_ST7 may be substantially the same as or similar to the first compensation stage GC_ST1 or the second compensation stage GC_ST2, described above with reference to FIG. 5. The emission driver EMDV may include emission stages EM_ST1 and EM_ST2, and each of the emission stages EM_ST1 and EM_ST2 may be connected to two of emission gate lines EML1, EML2, EML3, and EML4.

An emission start signal EM_STP may be applied to an emission start line EM_SPTL. The emission driver EMDV may generate emission gate signals EM[1], EM[2], EM[3], and EM[4] in response to the emission start signal EM_STP transmitted thereto through the emission start line EM_SPTL.

In an embodiment, as described above with reference to FIG. 4, a first clock signal CLK1 and a second clock signal CLK2 may be provided to the compensation stages GC_ST1, GC_ST2, . . . , GC_ST6, and GC_ST7 through a first clock signal line CLKL1 and a second clock signal line CLKL2. As described with reference to FIG. 4, the first clock signal CLK1 and the second clock signal CLK2 may be applied to different clock input terminals of adjacent compensation stages among the compensation stages GC_ST1, GC_ST2, . . . , GC_ST6, and GC_ST7. In an embodiment, as shown in FIG. 7B, the first clock signal CLK1 may have a logic low level and a logic high level for 4 horizontal periods 4H as a period. The second clock signal CLK2 may have a waveform delayed by 2 horizontal periods 2H from that of the first clock signal CLK1.

Figure 7B:
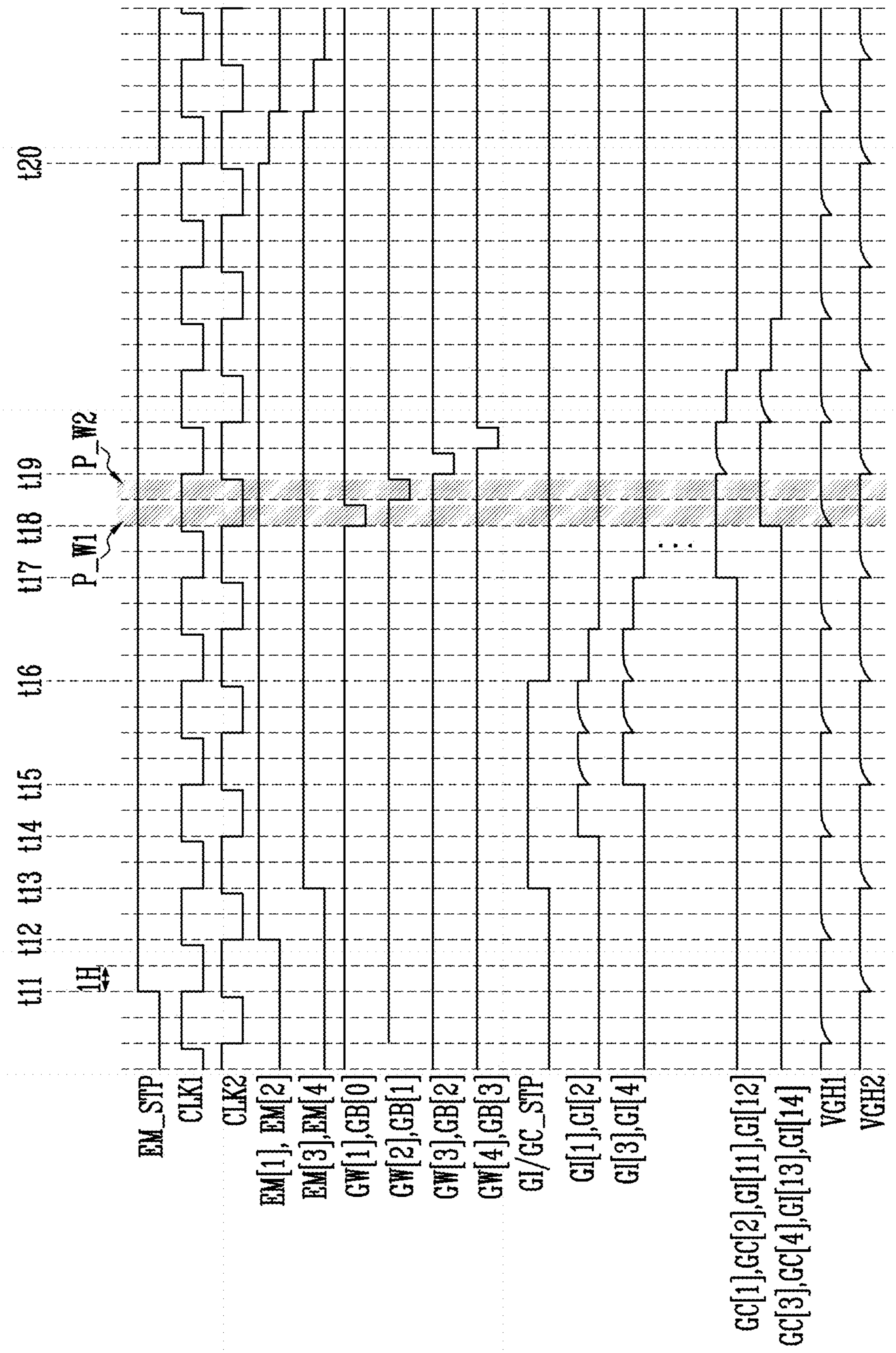
FIG. 7B is a waveform diagram illustrating an embodiment of signals in the gate driver shown in FIG. 7A.

In an embodiment, as shown in FIGS. 7A and 7B, a first emission gate signal EM[1] and a second emission gate signal EM[2] may be provided to a first emission gate line EML1 and a second emission gate line EML2 from a first emission stage EM_ST1. A third emission gate signal EM[3] and a fourth emission gate signal EM[4] may be provided to a third emission gate line EML3 and a fourth emission gate line EML4 from a second emission stage EM_ST2.

A first write gate signal GW[1] may be provided to a first write gate line GWL1 from a first write stage GW_ST1. Since a zeroth bypass line GBL0 is connected to the first write gate line GWL1, the first write gate signal GW[1] may be provided as a zeroth bypass gate signal GB[0] to the zeroth bypass line GBL0.

In such an embodiment, a second write gate signal GW[2] may be provided to a second write gate line GWL2 from a second write stage GW_ST2, and be provided as a first bypass gate signal GB[1] to a first bypass line GBL1. A third write gate signal GW[3] may be provided to a third write gate line GWL3 from a third write stage GW_ST3, and be provided as a second bypass gate signal GB[2] to a second bypass line GBL2. A fourth write gate signal GW[4] may be provided to a fourth write gate line GWL4 from a fourth write stage GW_ST4, and be provided as a third bypass gate signal GB[3] to a third bypass line GBL3.

An initialization/compensation start signal GI/GC_STP may be provided to a start signal line STPL.

A first initialization gate signal GI[1] may be provided to a first initialization gate line GIL1 from a first compensation stage GC_ST1, and be provided as a second initialization gate signal GI[2] to a second initialization gate line GIL2 (i.e., the second initialization gate line GIL2 connected to the first initialization gate line GIL1).

In such an embodiment, a third initialization gate signal GI[3] may be provided to a third initialization gate line GIL3 from a second compensation stage GC_ST2, and be provided as a fourth initialization gate signal GI[4] to a fourth initialization gate line GIL4 (i.e., the fourth initialization gate line GIL4 connected to the third initialization gate line GIL3).

An eleventh initialization gate signal GI[11] may be provided to an eleventh initialization gate line GIL11 from a sixth compensation stage GC_ST6, and be provided as a twelfth initialization gate signal GI[12] to a twelfth initialization gate line GIL12. In such an embodiment, since the eleventh initialization gate line GIL11 is connected to a first compensation gate line GCL1 and a second compensation gate line GCL2, the eleventh initialization gate signal GI[11] may be provided to the first compensation gate line GCL1 and the second compensation gate line GCL2, as a first compensation gate signal CG[1] and a second compensation gate signal GC[2], respectively.

In such an embodiment, a thirteenth initialization gate signal GI[13] may be provided to a thirteenth initialization gate line GIL13 from a seventh compensation stage GC_ST7, and be provided as a fourteenth initialization gate signal GI[14] to a fourteenth initialization gate line GIL14. In such an embodiment, since the thirteenth initialization gate line GIL13 is connected to a third compensation gate line GCL3 and a fourth compensation gate line GCL4, the thirteenth initialization gate signal GI[13] may be provided to the third compensation gate line GCL3 and the fourth compensation gate line GCL4, as a third compensation gate signal CG[3] and a fourth compensation gate signal GC[4], respectively.

A first gate power voltage VGH1 may be provided to a first gate power line VGHL1, and a second gate power voltage VGH2 may be provided to a second gate power line VGHL2.

At an eleventh time point t11, the emission start signal EM_STP may be changed from a logic low level (or turn-on level) to a logic high level (or turn-off level) and maintained as being in the logic high level until a twentieth time point t20, at which the emission start signal EM_STP is changed from the logic high level the logic low level. The first emission stage EM_ST1 may generate the first emission gate signal EM[1] and the second emission gate signal EM[2] by delaying the emission start signal EM_STP by 2 horizontal periods 2H.

At a twelfth time point t12, the first emission gate signal EM[1] and the second emission gate signal EM[2] may be changed from the logic low level to the logic high level. The second emission stage EM_ST2 may generate the third emission gate signal EM[3] and the fourth emission gate signal EM[4] by delaying the first emission gate signal EM[1] (or the second emission gate signal EM[2]) by 2 horizontal periods 2H.

At a thirteenth time point t13, the third emission gate signal EM[3] and the fourth emission gate signal EM[4] may be changed from the logic low level to the logic high level.

Accordingly, in such an embodiment, the emission stages EM_ST1 and EM_ST2 (or the emission driver EMDV) may sequentially output, two by two, emission gate signals EM[1], EM[2], EM[3], and EM[4] corresponding to the emission start signal EM_STP.

In such an embodiment, at the thirteenth time point t13, the initialization/compensation start signal GI/GC_STP may be changed from the logic low level to the logic high level. The first compensation stage GC_ST1 (or a first initialization stage) may generate the first initialization gate signal GI[1] and the second initialization gate signal GI[2] by delaying the initialization/compensation start signal GI/GC_STP by a half period (i.e., 2 horizontal periods 2H) of the first clock signal CLK1.

At a fourteenth time point t14, the first initialization gate signal GI[1] and the second initialization gate signal GI[2] may be changed from the logic low level to the logic high level. As described above with reference to FIGS. 5 and 6, the first compensation stage GC_ST1 may output the first gate power voltage VGH1 as the first initialization gate signal GI[1] and the second initialization gate signal GI[2], and a temporary drop may occur in the first gate power voltage VGH1.

In such an embodiment, the second compensation stage GC_ST2 (or a second initialization stage) may generate the third initialization gate signal GI[3] and the fourth initialization gate signal GI[4] by delaying the first initialization gate signal GI[1] (or the second initialization gate signal GI[2]) by 2 horizontal periods 2H.

At a fifteenth time point t15, the third initialization gate signal GI[3] and the fourth initialization gate signal GI[4] may be changed from the logic low level to the logic high level. As described with reference to FIGS. 5 and 6, the second compensation stage GC_ST2 may output the second gate power voltage VGH2 as the third initialization gate signal GI[3] and the fourth initialization gate signal GI[4], and a temporary drop may occur in the second gate power voltage VGH2.

At a sixteenth time point t16, the initialization/compensation start signal GI/GC_STP may be changed from the logic high level to the logic low level. The sixteenth time point t16 may be a time after 8 horizontal periods 8H elapses from the fourteenth time point t14. As at the fifth time point t5 shown in FIG. 6, a temporary drop may occur in the second gate power voltage VGH2 due to a coupling error.

At a seventeenth time point t17, as at the fifteenth time point t15, the first initialization gate signal GI[1] and the second initialization gate signal GI[2] may be changed from the logic low level to the logic high level. That is, the sixth compensation stage GC_ST6 may output the eleventh initialization gate signal GI[11] and the twelfth initialization gate signal GI[12], each of which has the logic high level. In such an embodiment, since the eleventh initialization gate signal GI[11] is connected to the first compensation gate line GCL1 and the second compensation gate line GCL2, the first compensation gate signal GC[1] and the second compensation gate signal GC[2] may be changed from the logic low level to the logic high level.

The sixth compensation stage GC_ST6, as an even-numbered compensation stage, may output the second gate power voltage VGH2 as the first compensation gate signal GC[1] and the second compensation gate signal GC[2], and a temporary drop may occur in the second gate power voltage VGH2.

At an eighteenth time point t18, like the fourteenth time point t14, the thirteenth initialization gate signal GI[13], the fourteenth initialization gate signal GI[14], the third compensation gate signal GC[3], and the fourth compensation gate signal GC[4] may be changed from the logic low level to the logic high level. Accordingly, the seventh compensation stage GC_ST7 may output the thirteenth initialization gate signal GI[13], the fourteenth initialization gate signal GI[14], the third compensation gate signal GC[3], and the fourth compensation gate signal GC[4], each of which has the logic high level.

The seventh compensation stage GC_ST7, as an odd-numbered compensation stage, may output the first gate power voltage VGH1 as the third compensation gate signal GC[3] and the fourth compensation gate signal GC[4], and a temporary drop may occur in the second gate power voltage VGH2.

A drop (or ripple) may occur in the first gate power voltage VGH1 and the second gate power voltage VGH2 every 4 horizontal periods 4H as a period, according to an operation of the gate driver GDV (or the compensation gate driver GCDV).

In such an embodiment, at the eighteenth time point t18 (or during a first write period P_W1), the first write gate signal GW[1] and the zeroth bypass gate signal GB[0] may be changed from the logic high level to the logic low level. Subsequently, at an interval of one horizontal period 1H, the other write gate signals GW[2], GW[3], and GW[4] (and the other bypass gate signals GB[1], GB[2], and GB[3]) may be sequentially changed from the logic high level to the logic low level. In one embodiment, for example, at a nineteenth time point t19 (or during a second write period P_W2), the second write gate signal GW[2] and the first bypass gate signal GB[1] may be changed from the logic high level to the logic low level.

In the first write period P_W1 and the second write period P_W2, the first compensation gate signal GC[1] and the second compensation gate signal GC[2], which correspond to the first write gate signal GW[1] and the second write gate signal GW[2], and the second gate power voltage VGH2, based on which the first compensation gate signal GC[1] and the second compensation gate signal GC[2] are generated, may not have any voltage drop. Therefore, a ripple of the second gate power voltage VGH2 may have no influence on the first write gate signal GW[1] and the second write gate signal GW[2]. Accordingly, pixels to which the first write gate signal GW[1] and the second write gate signal GW[2] are provided may precisely record a data voltage therein, regardless of the ripple of the second gate power voltage VGH2, and emit light with a luminance corresponding to the data signal. Therefore, any substantial or recognizable luminance difference may not occur between the pixels.

Figure 8:
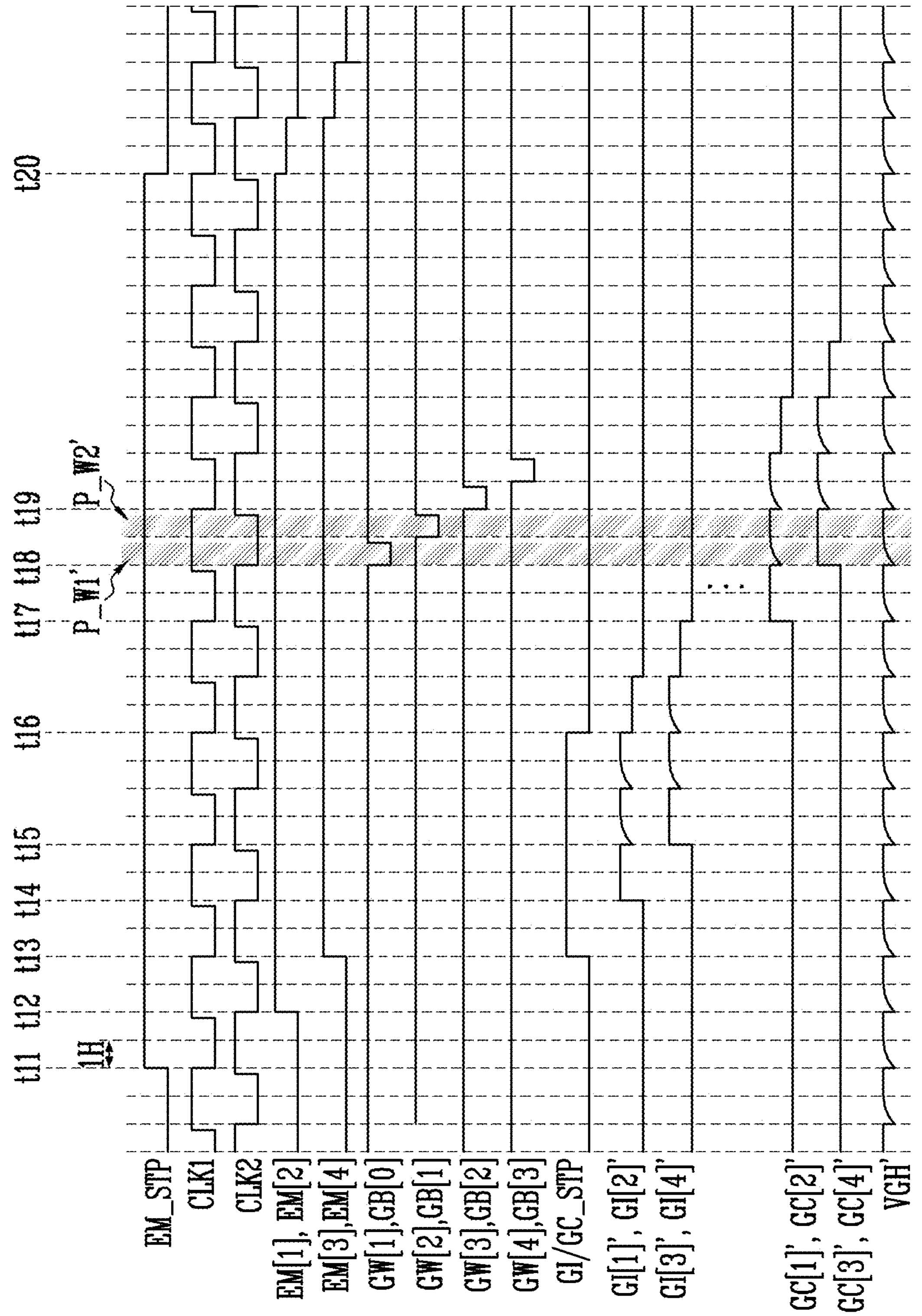
FIG. 8 is a waveform diagram illustrating a comparative example of the signals in the gate driver shown in FIG. 7A.

FIG. 8 is a waveform diagram illustrating a comparative example of the signals in the gate driver shown in FIG. 7A. In FIG. 8, signals in the gate driver are illustrated, when the first gate power line VGHL1 and the second gate power line VGHL2, which are shown in FIG. 7A, are integrated as a single gate power line.

Waveforms shown in FIG. 8 are substantially the same as or similar to those described with reference to FIG. 7B, except a gate power voltage VGH' applied to the single gate power line, and therefore, any repetitive detailed descriptions of the same or like features will be omitted.

In the comparative example, where the compensation stages GC_ST1, GC_ST2, . . . , GC_ST6, and GC_ST7 described with reference to FIG. 7A are connected to only a single gate power line instead of the first and second gate power lines VGHL1 and VGHL2, a drop (or ripple) may occur in the gate power voltage VGH' applied to the single gate power line at every 2 horizontal periods 2H as a period. Accordingly, initialization gate signals GI[1]', GI[2]', GI[3]', and GI[4]' and compensation gate signals GC[1]', GC[2]', GC[3]', and GC[4]' may have a voltage drop at every 2 horizontal periods 2H as a period.

In a first write period P_W1', the gate power voltage VGH' and a first compensation gate signal GC[1]' corresponding to the first write gate signal GW[1] may have a voltage drop. Therefore, a ripple of the gate power voltage VGH' may have influence on the first write gate signal GW[1]. In the comparative example, since the third thin film transistor M3 (see FIG. 3) of each of first pixels to which the first write gate signal GW[1] is provided is not properly turned on by the first compensation gate signal GC[1]' (i.e., the first compensation gate signal GC[1]' having the voltage drop), a data voltage may not be accurately recorded in the storage capacitor Cst of each of the first pixels, and the first pixels may not emit light with a desired luminance.

In the comparative example, in a second write period P_W2', the gate power voltage VGH' and a second compensation gate signal GC[2]' corresponding to the second write gate signal GW[2] may not have any voltage drop. Therefore, the third thin film transistor M3 (see FIG. 3) of each of second pixels to which the second write gate signal GW[2] is provided may be turned on by the second compensation gate signal GC[2]', a data voltage may be accurately recorded in the storage capacitor Cst of each of the second pixels, and the second pixels may emit light with a desired luminance. Therefore, a luminance difference between the first pixels and the second pixels may occur.

In an embodiment of the invention, as described above with reference to FIGS. 7A, 7B, and 8, since the compensation gate driver GCDV (or the compensation stages GC_ST1, GC_ST2, . . . , GC_ST6, and GC_ST7) receives the first gate power voltage VGH1 and the second gate power voltage VGH2 through the first gate power line VGHL1 and the second gate power line VGHL2, i.e., since output terminals of adjacent compensation stages among the compensation stages GC_ST1, GC_ST2, . . . , GC_ST6, and GC_ST7 are respectively connected to the first gate power line VGHL1 and the second gate power line VGHL2, which are independent from each other, as described with reference to FIG. 5, a number of times (i.e., a ripple) the first gate power voltage VGH1 and the second gate power voltage VGH2 are dropped may be relatively decreased, and a luminance difference due to the ripple may be reduced.

Figure 9:
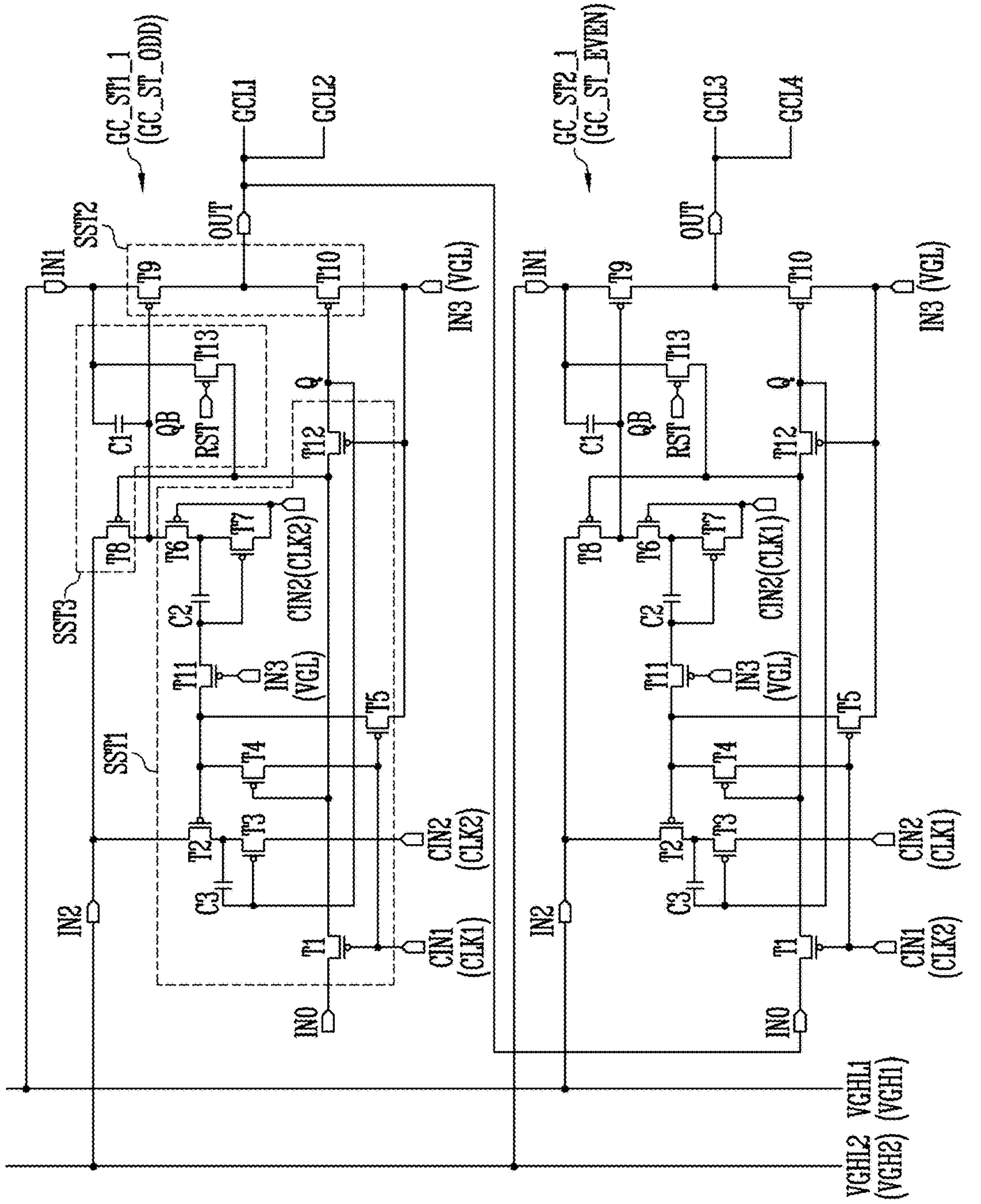
FIG. 9 is a circuit diagram illustrating an alternative embodiment of the first compensation stage and the second compensation stage, which are included in the compensation gate driver shown in FIG. 4.

FIG. 9 is a circuit diagram illustrating an alternative embodiment of the first compensation stage and the second compensation stage, which are included in the compensation gate driver shown in FIG. 4.

Referring to FIGS. 5 and 9, a first compensation stage GC_ST1_1 and a second compensation stage GC_ST2_1 may be substantially the same as or similar to the first compensation stage GC_ST1 and the second compensation stage GC_ST2, which are described above with reference to FIG. 5, except a connection configuration of the eighth transistor T8. The same or like elements shown in FIG. 9 have been labeled with the same reference characters as used above to describe the embodiments of the first compensation stage GC_ST1 and the second compensation stage GC_ST2 shown in FIG. 5, and any repetitive detailed description thereof will hereinafter be omitted or simplified.

In an embodiment, in the first compensation stage GC_ST1_1, the first electrode of the eighth transistor T8 may be connected to the second gate power line VGHL2 (or the second power input terminal IN2). The eighth transistor T8 may constantly maintain the voltage of the first control node QB in response to the voltage at the second electrode of the first transistor T1. In one embodiment, for example, when the voltage of the second control node Q has the logic low level, the eighth transistor T8 may maintain the voltage of the first control node QB to have the logic high level by using the second gate power voltage VGH2.

Although a voltage drop occurs in the second gate power voltage VGH2, the voltage drop of the second gate power voltage VGH2 may have no substantial influence on the first control node QB due to the first capacitor C1.

Therefore, the first compensation stage GC_ST1_1 may output a first compensation gate signal having no voltage drop, corresponding to the first write period P_W1 described with reference to FIG. 7.

In such an embodiment, in the second compensation stage GC_ST2_1, the first electrode of the eighth transistor T8 may be connected to the first gate power line VGHL1. Although a voltage drop occurs in the first gate power voltage VGH1, the voltage drop of the first gate power voltage VGH1 may hardly have influence on the first control node QB due to the first capacitor C1.

Figure 10:
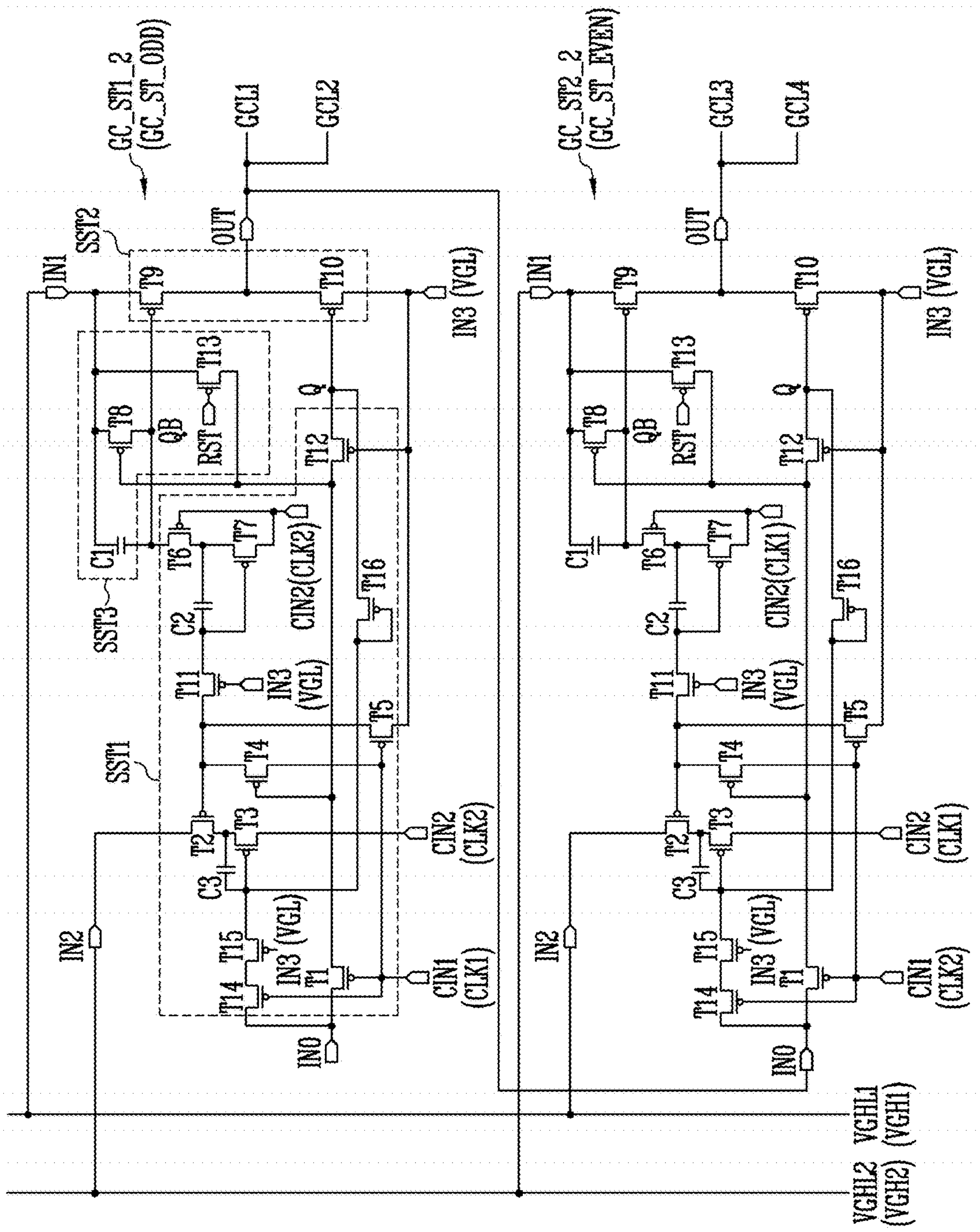
FIG. 10 is a circuit diagram illustrating another alternative embodiment of the first compensation stage and the second compensation stage, which are included in the compensation gate driver shown in FIG. 4.
Figure 11:
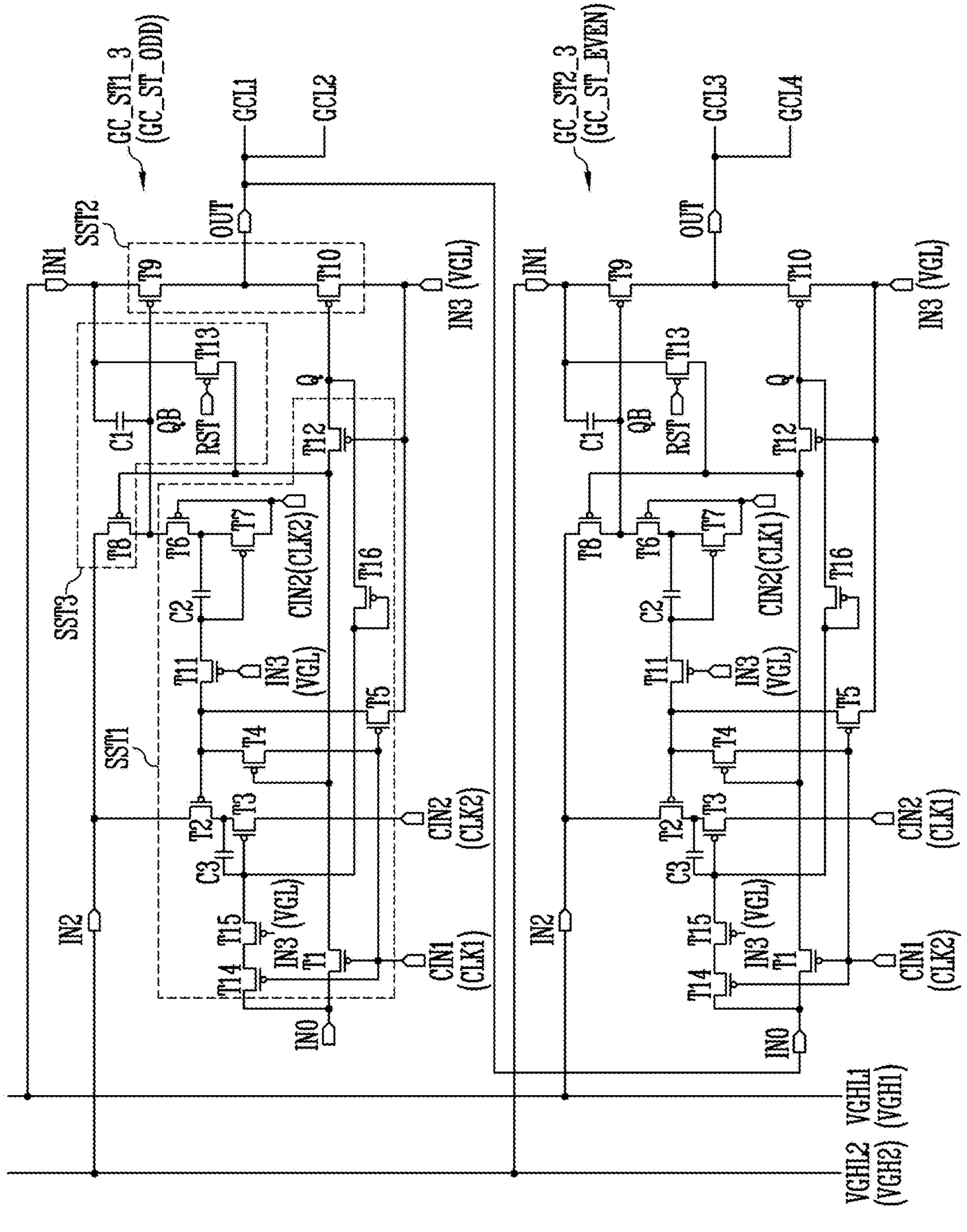
FIG. 11 is a circuit diagram illustrating still another alternative embodiment of the first compensation stage and the second compensation stage, which are included in the compensation gate driver shown in FIG. 4.

FIG. 10 is a circuit diagram illustrating another alternative embodiment of the first compensation stage and the second compensation stage, which are included in the compensation gate driver shown in FIG. 4. FIG. 11 is a circuit diagram illustrating still another alternative embodiment of the first compensation stage and the second compensation stage, which are included in the compensation gate driver shown in FIG. 4.

Referring to FIGS. 5 and 10, a first compensation stage GC_ST1_2 and a second compensation stage GC_ST2_2 shown in FIG. 10 are substantially the same or similar to the first compensation stage GC_ST1 and the second compensation stage GC_ST2 shown in FIG. 5, except that each of the first compensation stage GC_ST1_2 and the second compensation stage GC_ST2_2 further includes a fourteenth transistor T14, a fifteenth transistor T15, and a sixteenth transistor T16. The same or like elements shown in FIG. 10 have been labeled with the same reference characters as used above to describe the embodiments of the first compensation stage GC_ST1 and the second compensation stage GC_ST2 shown in FIG. 5, and any repetitive detailed description thereof will hereinafter be omitted or simplified.

In an embodiment, as shown in FIG. 10, the sixteenth transistor T16 (or a third auxiliary transistor) may include a first electrode connected to the gate electrode of the thirteenth transistor t13, a second electrode connected to the second control node Q, and a gate electrode connected to the gate electrode of the thirteenth transistor T13. In such an embodiment, the sixteenth transistor T16 may be diode-connected between the gate electrode of the thirteenth transistor T13 and the second control node Q.

In such an embodiment, as described above with reference to FIGS. 5 and 6, the second node voltage V_Q of the second control node Q of the first compensation stage GC_ST1 (shown in FIG. 6) may alternately have the second voltage low level (i.e., 2VGL+|Vth|) and the second logic low level (i.e., VGL+|Vth|) after the seventh time point t7. The output voltage V_OUT (or the first compensation gate signal) after the seventh time point t7 may have a voltage fluctuation, corresponding to the second node voltage V_Q.

In such an embodiment, at the seventh time point t7, the second clock signal CLK2 may be changed from the first logic low level to the logic high level, and the second clock signal CLK2 having the logic high level is applied to the second electrode of the third capacitor C3 through the third transistor T3. After the voltage of the gate electrode of the thirteenth transistor T13 is changed to the fourth voltage level (i.e., VGL+2|Vth|), the sixteenth transistor T16 may constantly maintain the second node voltage V_Q, regardless of a voltage fluctuation of the gate electrode of the thirteenth transistor T13. Therefore, after the seventh time point t7 described with reference to FIG. 6, the output voltage V_OUT (or the first compensation gate signal) has no voltage fluctuation (or ripple), and malfunction of a pixel due to the voltage fluctuation of the output voltage V_OUT may be effectively prevented.

The fourteenth transistor T14 (or a first auxiliary transistor) may include a first electrode connected to the input terminal IN0, a second electrode connected to a first electrode of the fifteenth transistor T15, and a gate electrode connected to the first clock input terminal CIN1. The fifteenth transistor T15 may include the first electrode connected to the second electrode of the fourteenth transistor T14, a second electrode connected to the gate electrode of the thirteenth transistor T13, and a gate electrode connected to the third power input terminal IN3.

The fourteenth transistor T14 may initialize the gate electrode of the thirteenth transistor T13 by using a start signal (or previous compensation gate signal) provided to the input terminal IN0, in response to the first clock signal CLK1 provided through the first clock input terminal CIN1. In such an embodiment, where the sixteenth transistor T16 is further included, the gate electrode of the thirteenth transistor T13 is not initialized by the second control node Q.

The fifteenth transistor T15 (or a second auxiliary transistor) may decrease or divide a bias voltage applied to the fourteenth transistor T14 between the input terminal IN0 and the gate electrode of the thirteenth transistor T13.

The second compensation sage GC_ST2_2 (or an even-numbered compensation stage GC_ST_EVEN) is substantially the same as or similar to the first compensation stage GC_ST1_2 (or an odd-numbered compensation stage GC_ST_ODD), and therefore, any repetitive detailed descriptions thereof will be omitted.

In an embodiment, as shown in FIG. 10, the first compensation stage GC_ST1_2 (and the second compensation stage GC_ST2_2) further includes the fourteenth transistor T14, the fifteenth transistor T15, and the sixteenth transistor T16, and a compensation gate signal may be prevented from fluctuating in a period in which the compensation gate signal has the logic low level.

In an embodiment, the eighth transistor T8 of the first compensation stage GC_ST1_2 is connected to the first gate power line VGHL1 and the eighth transistor T8 of the second compensation stage GC_ST2_2 is connected to the second gate power line VGHL2 as illustrated in FIG. 10, but the disclosure is not limited thereto.

In an alternative embodiment, as shown in FIG. 11, the eight transistor T8 of a first compensation stage GC_ST1_3 may be connected to the second gate power line VGHL2 (or the second power input terminal IN2), and the eighth transistor T8 of a second compensation stage GC_ST2_3 may be connected to the first gate power line VGHL1.

FIGS. 12A, 12B, 12C, and 12D are plan views illustrating alternative embodiment of the display device shown in FIG. 1.

Referring to FIGS. 2A, 12A, 12B, 12C, and 12D, embodiments of a display device DD_2 shown in FIGS. 12A, 12B, 12C, and 12D are substantially the same as the display device DD shown in FIG. 2A, except that the display device DD_2 further includes a third gate power line VGHL3.

In such embodiments, the third gate power line VGHL3 may be provided or disposed in the non-display area of the substrate SUB. The third gate power line VGHL3 may be connected to the first gate power line VGHL1 and the second gate power line VGHL2 in the pad area A_PD, and be disposed to be spaced apart from the first gate power line VGHL1 and the second gate power line VGHL2 in the non-display area out of the pad area A_PD.

Figure 12A:
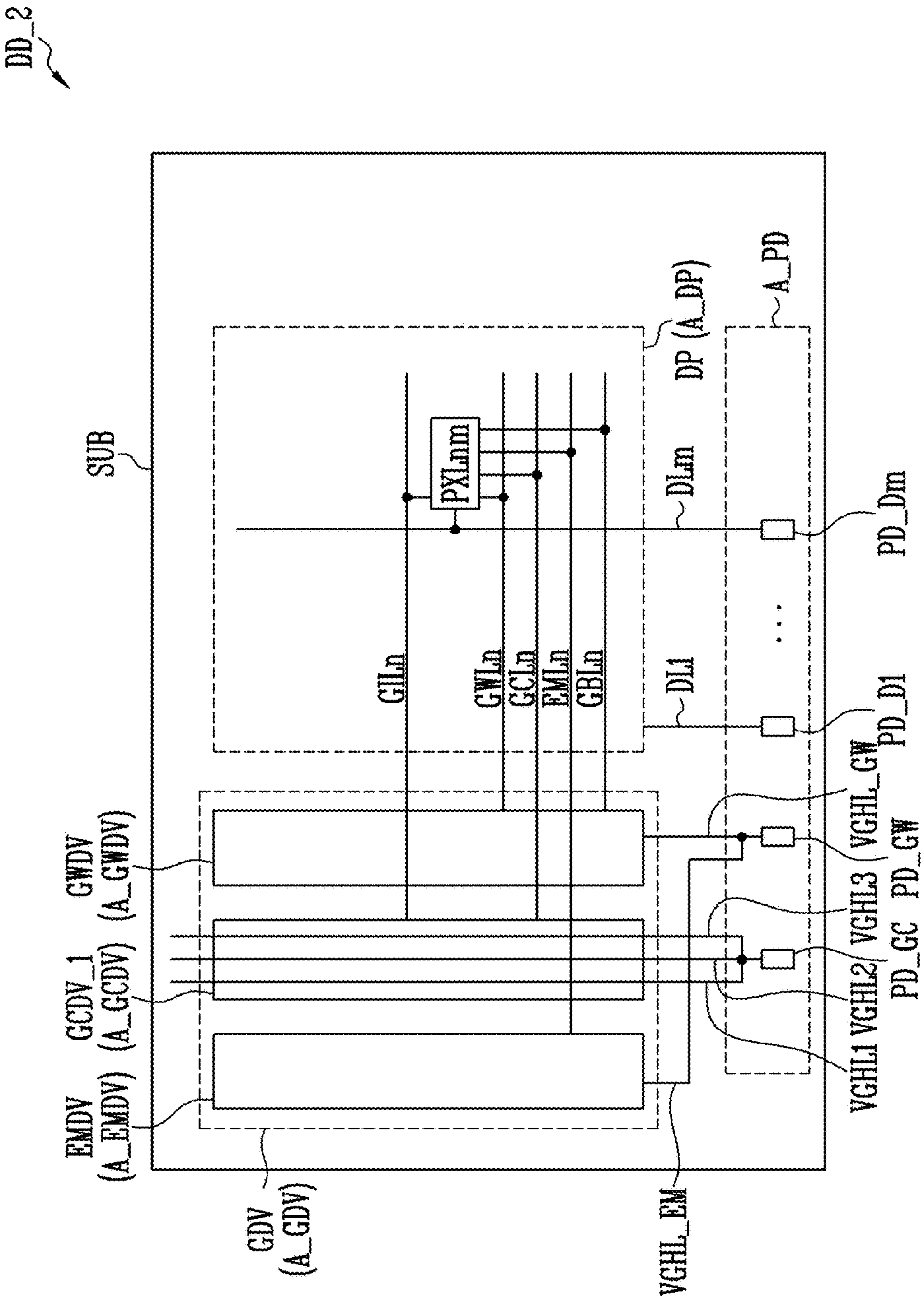
FIGS. 12A, 12B, 12C, and 12D are plan views illustrating alternative embodiments of the display device shown in FIG. 1.
Figure 12B:
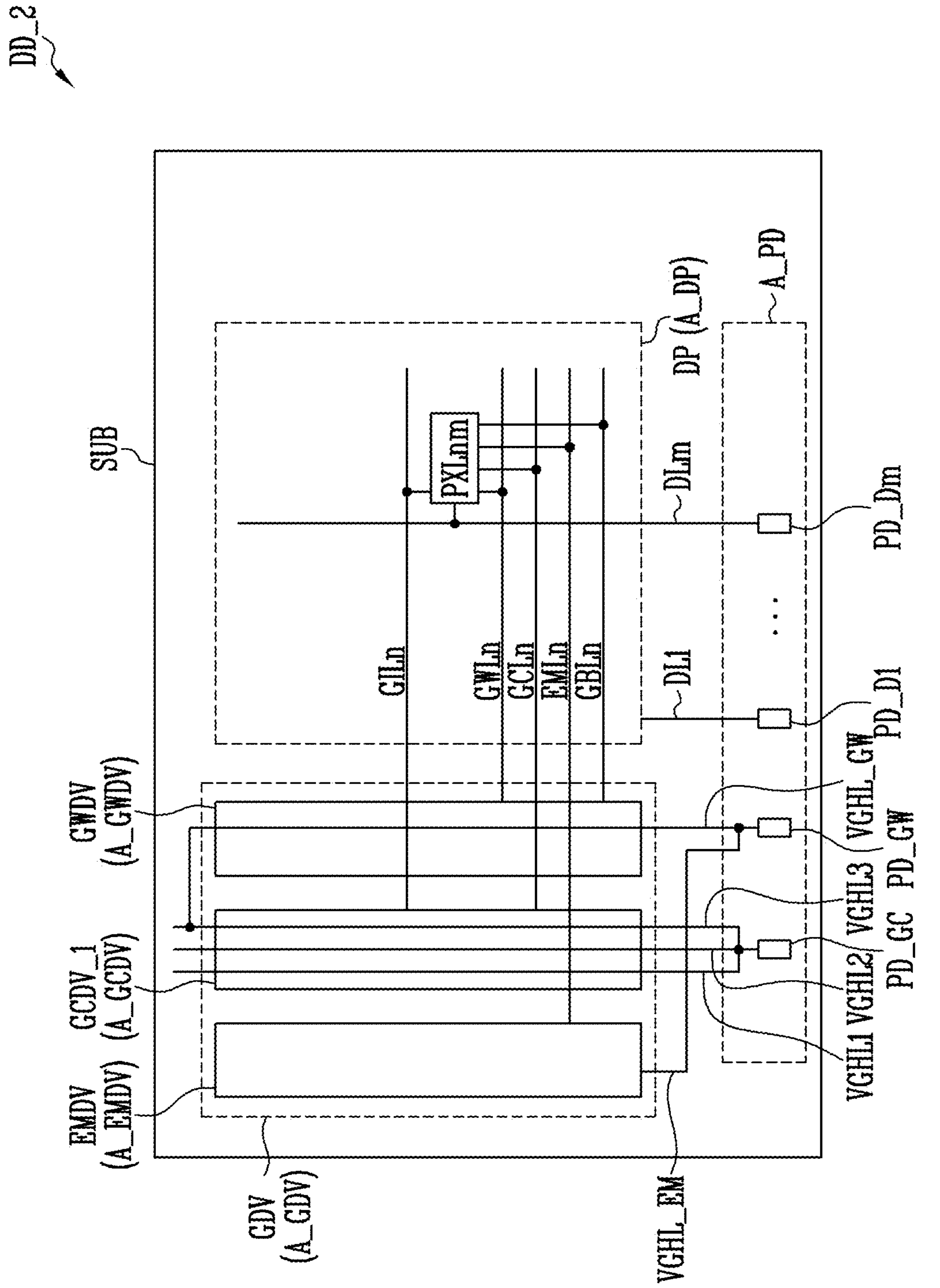
Figure 12C:
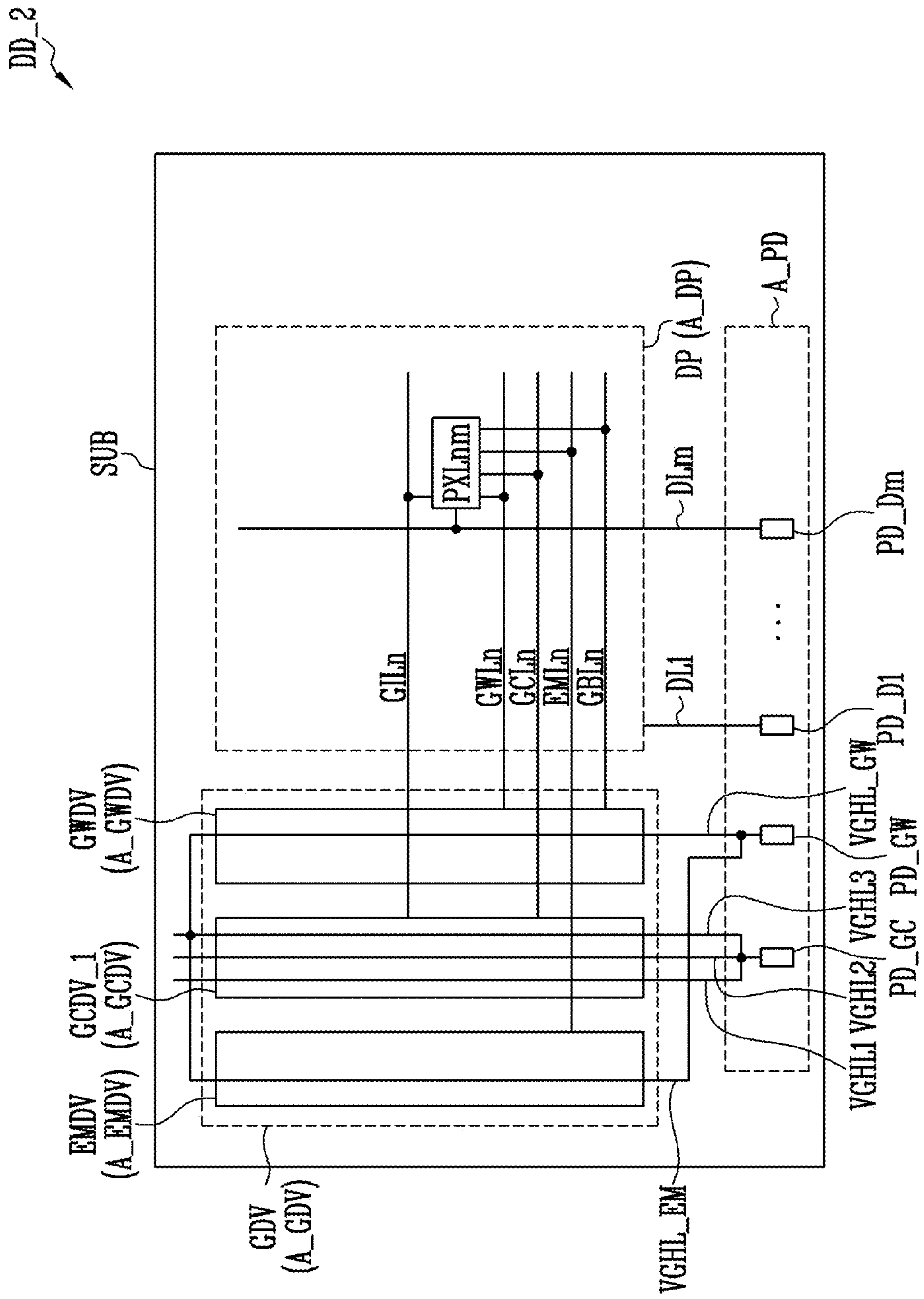

In an embodiment, as shown in FIG. 12A, the third gate power line VGHL3 may be electrically separated from the write gate power line VGHL_GW and the emission gate power line VGHL_EM. However, the disclosure is not limited thereto, and alternatively, the third gate power line VGHL3 may be electrically connected to at least one of the write gate power line VGHL_GW and the emission gate power line VGHL_EM. In an alternative embodiment, as shown in FIG. 12B, the third gate power line VGHL3 may be connected to the write gate power line VGHL_GW at an upper side of the gate circuit area A_GDV (i.e., the other side opposite to one side of the gate circuit area A_GDV adjacent to the pad area A_PD). In another alternative embodiment, as shown in FIG. 12C, the third gate power line VGHL3 may be connected to the write gate power line VGHL_GW and the emission gate power line VGHL_EM at the upper side of the gate circuit area A_GDV. In such an embodiment, a drop of a gate power voltage applied to the third gate power line VGHL3, the write gate power line VGHL_GW, and the emission gate power line VGHL_EM may be reduced.

In embodiments in which the third gate power line VGHL3 is connected to at least one of the write gate power line VGHL_GW and the emission gate power line VGHL_EM, the first gate power line VGHL1 and the second gate power line VGHL2 are not directly connected to the write gate power line VGHL_GW and the emission gate power line VGHL_EM.

A compensation gate driver GCDV_1 (or initialization gate driver) may have the form of a shift register, and include a plurality of compensation sages (or initialization stages). The compensation gate driver GCDV_1 (or each of the compensation stages) may be connected to one of the first gate power line VGHL1 and the second gate power line VGHL2, and the third gate power line VGHL3.

In embodiment, the compensation gate driver GCDV_1 is disposed at one side (e.g., a left side) of the display unit DP as illustrated in FIGS. 12A, 12B, and 12C, but the disclosure is not limited thereto.

Hereinafter, an embodiment will be described with reference to FIGS. 2B, 12A, and 12D. The substrate SUB may further include a second compensation gate circuit area A_GCDV2 located at the other side (e.g., a right side) of the display area A_DP, and a second compensation gate driver GCDV2_1 may be formed or disposed in the second compensation gate circuit area A_GCDV2. The second compensation gate driver GCDV2_1 may be included in the gate driver GDV.

Each of a first gate power line VGHL1', a second gate power line VGHL2', and a third gate power line VGHL3' may extend up to the second compensation gate circuit area A_GCDV2 along an edge of the display area A_DP. In such an embodiment, as described with reference to FIG. 12A, the first gate power line VGHL1', the second gate power line VGHL2', and the third gate power line VGHL3' may be connected to each other in the pad area A_PD. The first gate power line VGHL1', the second gate power line VGHL2', and the third gate power line VGHL3' may not be connected to each other in the non-display area except the pad area A_PD, and may be disposed to be spaced apart from each other. In an embodiment, as shown in FIG. 12D, one ends of the first gate power line VGHL1', the second gate power line VGHL2', and the third gate power line VGHL3' may be connected to the first gate power pad PD_GC provided in the pad area A_PD, and one ends of the first gate power line VGHL1', the second gate power line VGHL2', and the third gate power line VGHL3' may be connected to the third gate power pad PD_GC2 provided in the pad area A_PD.

The second compensation gate driver GCDV2_1 may be substantially the same as or similar to the compensation gate driver GCDV (or first compensation gate driver), except for an arrangement position thereof.

The second compensation gate driver GCDV2_1 may have the form of a shift register, and include a plurality of compensation stages (or initialization stages). The second compensation gate driver GCDV2_1 (or each of the compensation stages) may be connected to the first gate power line VGHL1', the second gate power line VGHL2', and the third gate power line VGHL3'. The compensation stages may sequentially generate compensation gate signals having a turn-on level (e.g., a logic high level), corresponding to the compensation start signal (or initialization start signal) received from the timing controller TC (see FIG. 1). The compensation gate signals generated by the second compensation gate driver GCDV2_1 may be provided to corresponding compensation gate lines GCL1, . . . , and GCLn (see FIG. 1).

In an embodiment, the compensation gate signals generated by the second compensation gate driver GCDV2_1 may be used as initialization gate signals. The compensation gate signals generated by the second compensation gate driver GCDV2_1 may also be provided to corresponding initialization gate lines GIL1, . . . , and GILn (see FIG. 1).

Figure 12D:
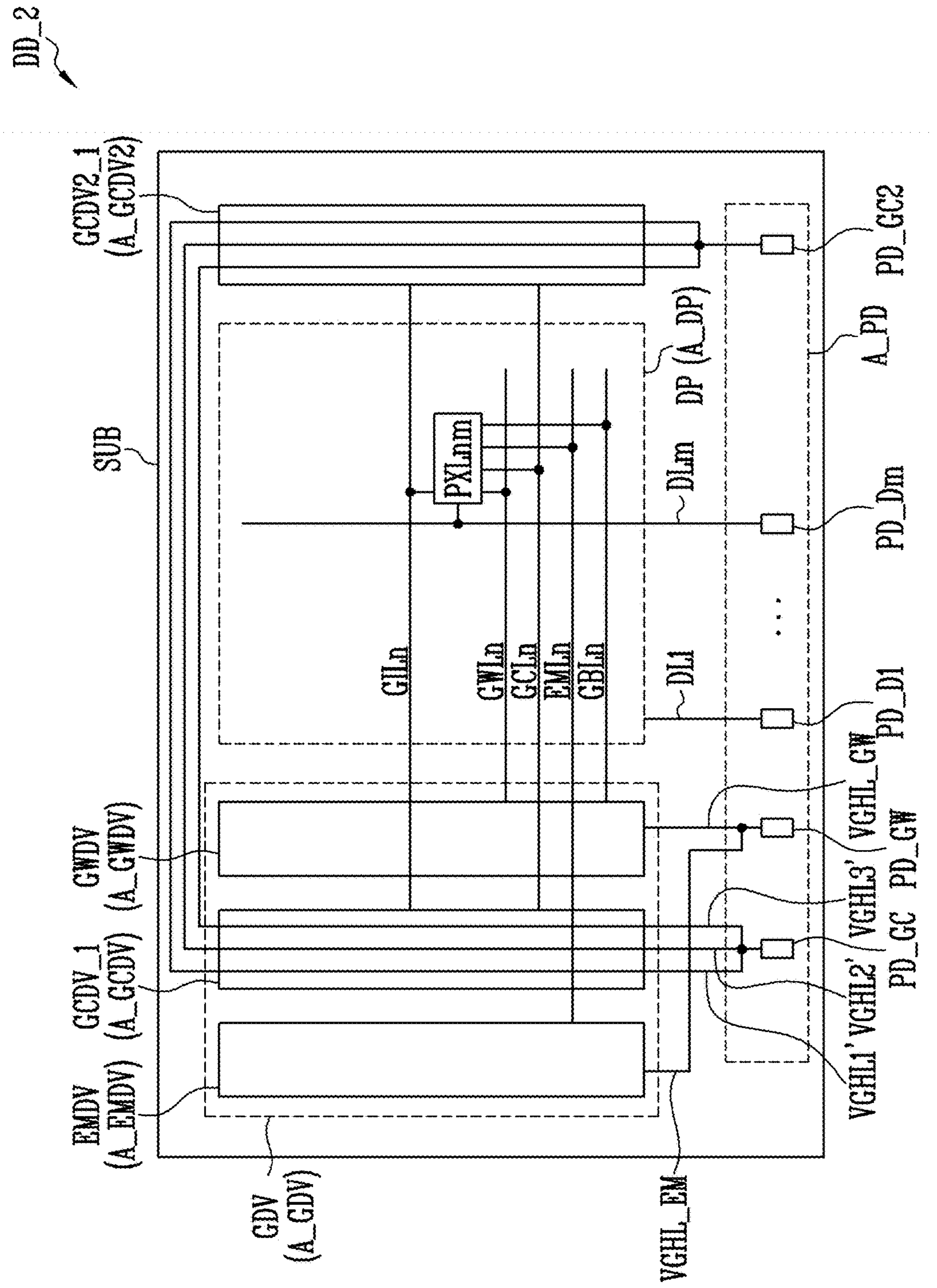

Embodiments of the display device DD_2 shown in FIGS. 12B and 12C may be variously modified to implement the first gate power line VGHL1', the second gate power line VGHL2', and the third gate power line VGHL3', and the second compensation gate driver GCDV2_1, which are shown in FIG. 12D.

A connection configuration between the compensation gate driver GCDV_1 and the first, second, and third gate power lines VGHL1, VGHL2, and VGHL3 will hereinafter be described with reference to FIG. 13.

Figure 13:
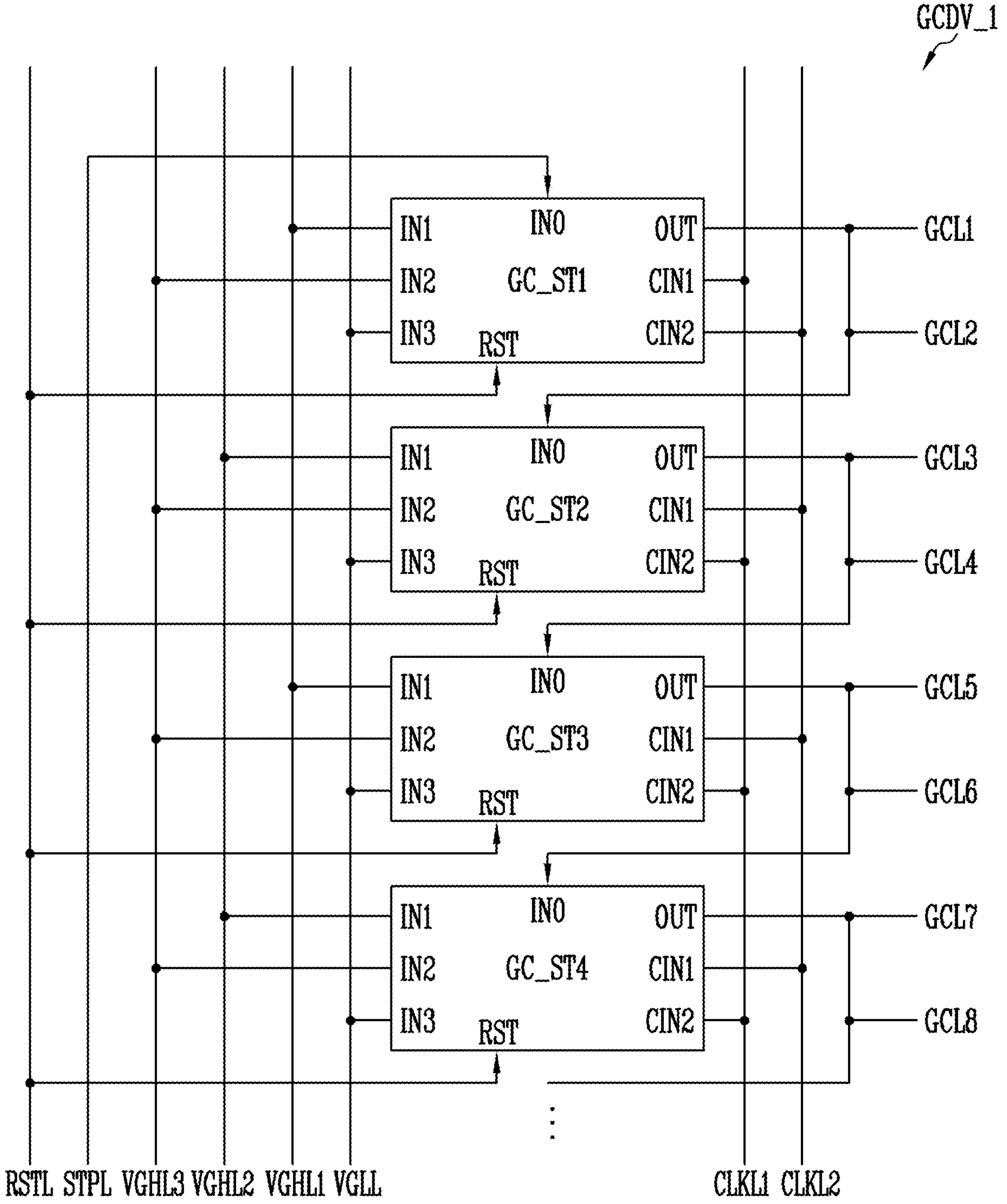
FIG. 13 is a diagram illustrating an embodiment of a compensation gate driver included in the display device shown in FIGS. 12A to 12D.
Figure 14:
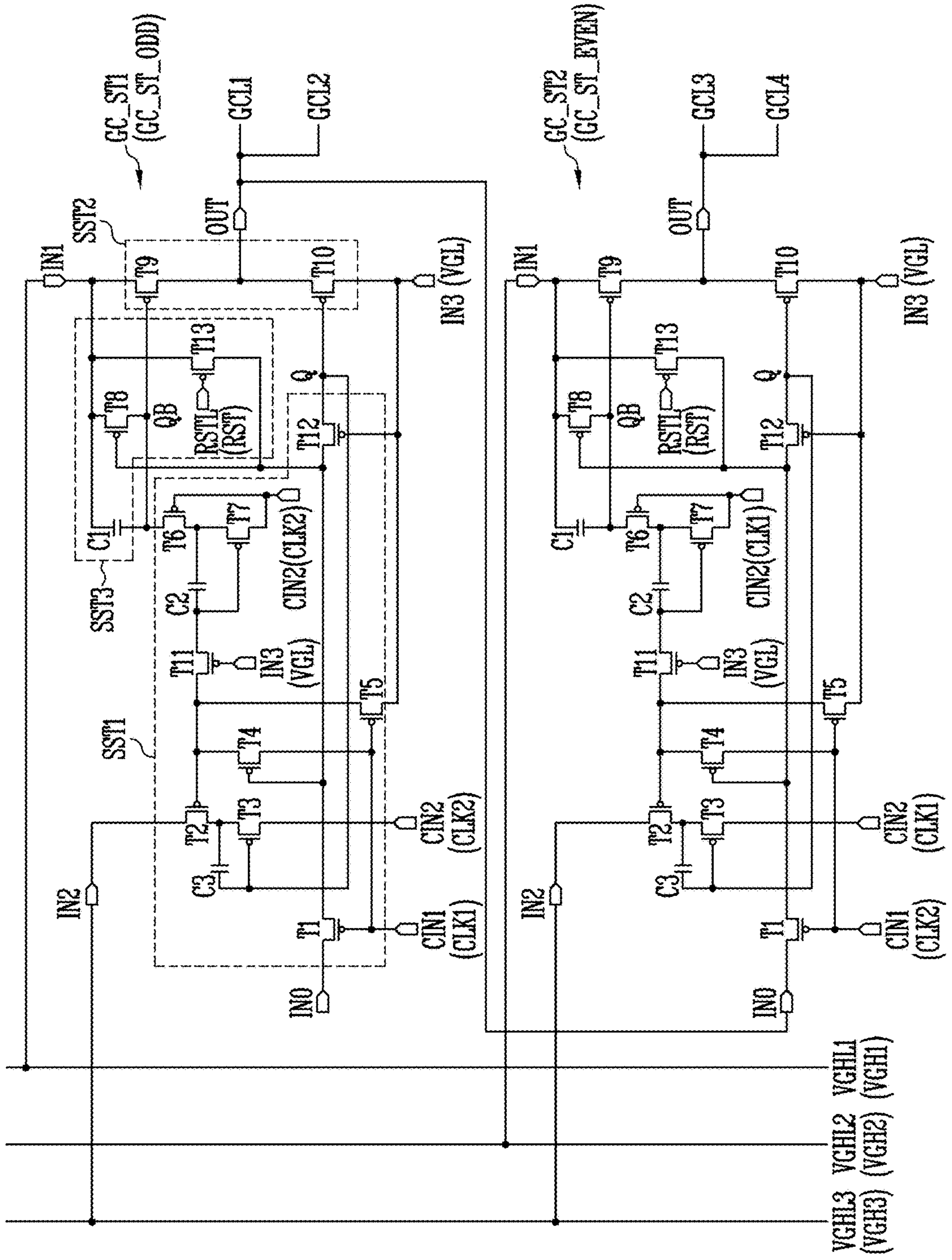
FIG. 14 is a circuit diagram illustrating an embodiment of a first compensation stage and a second compensation stage, which are included in the compensation gate driver shown in FIG. 13.

FIG. 13 is a diagram illustrating an embodiment of the compensation gate driver included in the display device shown in FIGS. 12A to 12D. FIG. 14 is a circuit diagram illustrating an embodiment of a first compensation stage and a second compensation stage, which are included in the compensation gate driver shown in FIG. 13.

In an embodiment, referring to FIGS. 12A and 13, the compensation gate driver GCDV_1 may include a plurality of compensation stages GC_ST1, GC_ST2, GC_ST3, and GC_ST4 (or stages). For convenience of description, only a portion of the compensation gate driver GCDV_1 is illustrated in FIG. 13. The compensation gate driver GCDV_1 is substantially identical to the compensation gate driver GCDV, except the third gate power line VGHL3, and therefore, overlapping descriptions will not be repeated.

The compensation stages GC_ST1, GC_ST2, GC_ST3, and GC_ST4 may be connected to one of the first gate power line VGHL1 and the second gate power line VGHL2, and the third gate power line VGHL3.

In one embodiment, for example, in odd-numbered compensation stages GC_ST1 and GC_ST3, the first power input terminal IN1 may be connected to the first gate power line VGHL1. In even-numbered compensation stages GC_ST2 and GC_ST4, the first power input terminal IN1 may be connected to the second gate power line VGHL2. In the compensation stages GC_ST1, GC_ST2, GC_ST3, and GC_ST4, the second power input terminal IN2 may be connected to the third gate power line VGHL3.

In an embodiment, as described with reference to FIG. 4, each of the compensation stages GC_ST1, GC_ST2, GC_ST3, and GC_ST4 may be connected to two compensation gate lines among the compensation gate lines GCL1, GCL2, GCL3, GCL4, GCL5, GCL6, GCL7, and GCL8, and simultaneously output a compensation gate signal to the two gate lines. In an embodiment, each of the compensation stages GC_ST1, GC_ST2, GC_ST3, and GC_ST4 may provide compensation gate signals as initialization gate signals to the initialization gate lines GIL1, . . . , and GILn (see FIG. 1).

Referring to FIGS. 5, 13, and 14, a first compensation stage GC_ST1 (or an odd-numbered compensation stage GC_ST_ODD) shown in FIG. 14 may be substantially the same as or similar to the first compensation stage GC_ST1 shown in FIG. 5, and a second compensation stage GC_ST2 (or an even-numbered compensation stage GC_ST_EVEN) shown in FIG. 14 may be substantially the same as or similar to the second compensation stage GC_ST2 shown in FIG. 5. Therefore, any repetitive detailed descriptions thereof will be omitted.

In such an embodiment, as compared with the first and second compensation stages GC_ST1 and GC_ST2 shown in FIG. 5, an internal circuit configuration of each of the compensation stages GC_ST1, GC_ST2, GC_ST3, and GC_ST4 is not changed, and only a connection configuration between the first, second, and third input terminals iN1, IN2, and IN3 of the compensation stages GC_ST1, GC_ST2, GC_ST3, and GC_ST4 and the first, second, and third gate power lines VGHL1, VGHL2, and VGHL3 may be changed.

In such an embodiment, as shown in FIGS. 13 and 14, a third gate power voltage (i.e., a gate power voltage applied to the second power input terminal IN2 through the third gate power line VGHL3) may be commonly used for the compensation stages GC_ST1, GC_ST2, GC_ST3, and GC_ST4 to control the voltage of an internal node (i.e., the first node Q and the second node QB). In such an embodiment, the first gate power voltage VGH1 applied to the first gate power line VGHL1 may be used for the odd-numbered compensation stages GC_ST1 and GC_ST3, and the second gate power voltage VGH2 applied to the second gate power line VGHL2 may be used for the even-numbered compensation stages GC_ST2 and GC_ST4 to output a compensation gate signal. In such an embodiment, as described with reference to FIG. 4, a gate power voltage equal to the first gate power voltage VGH1 may be applied to the first gate power line VGHL1. For convenience of description, a gate power voltage in the first gate power line VGHL1 may be referred to as the first gate power voltage VGH1, and a gate power voltage in the second gate power line VGHL2 may be referred to as the second gate power voltage VGH2.

In such an embodiment, a gate power voltage for controlling a voltage of an internal node and a gate power voltage for generating a compensation gate signal may be independently provided to each of the compensation stages GC_ST1, GC_ST2, GC_ST3, and GC_ST4. In such an embodiment, where the first gate power line VGHL1 and the second gate power line VGHL2, which are used to transfer a gate power voltage to the compensation stages GC_ST1, GC_ST2, GC_ST3, and GC_ST4, are connected to each other in the pad area A_PD, influence of a voltage drop on another gate power line is reduced since a path for the voltage drop is lengthened. Thus, a fluctuation of the gate power voltage for controlling the voltage of the internal node has no substantial influence on the gate power voltage for generating the compensation gate signal and the compensation gate signal, and a ripple of the compensation gate signal can be reduced.

In such an embodiment, when a compensation gate signal is generated, the odd-numbered compensation stages GC_ST1 and GC_ST3 and the even-numbered compensation stages GC_ST3 and GC_ST4 may alternately use the first gate power voltage VGH1 and the second gate power voltage VGH2. Thus, even when a fluctuation occurs in a compensation gate signal of a previous compensation stage, the fluctuation has no influence on a gate power voltage of a subsequent compensation stage and a subsequent compensation gate signal, and a ripple of compensation gate signals may be reduced.

FIG. 14 shows a detailed circuit configuration of an embodiment of the first compensation stage GC_ST1 (or odd-numbered compensation stage GC_ST_ODD) and the second compensation stage GC_ST2 (or even-numbered compensation stage GC_ST_EVEN, but the disclosure is not limited thereto.

Figure 15:
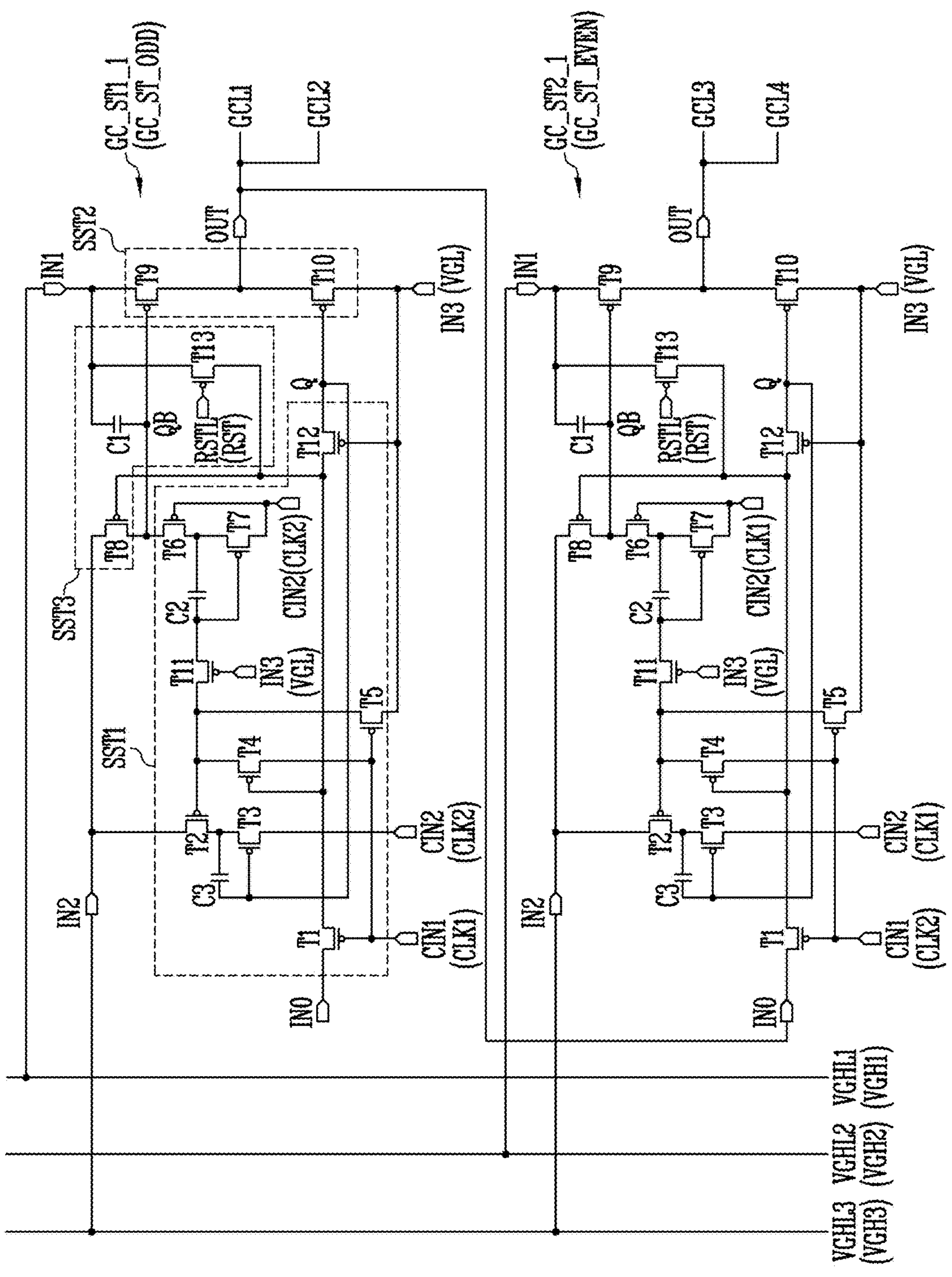
FIGS. 15, 16, and 17 are circuit diagrams illustrating various embodiments of the first compensation stage and the second compensation stage, which are included in the compensation gate driver shown in FIG. 13.
Figure 16:
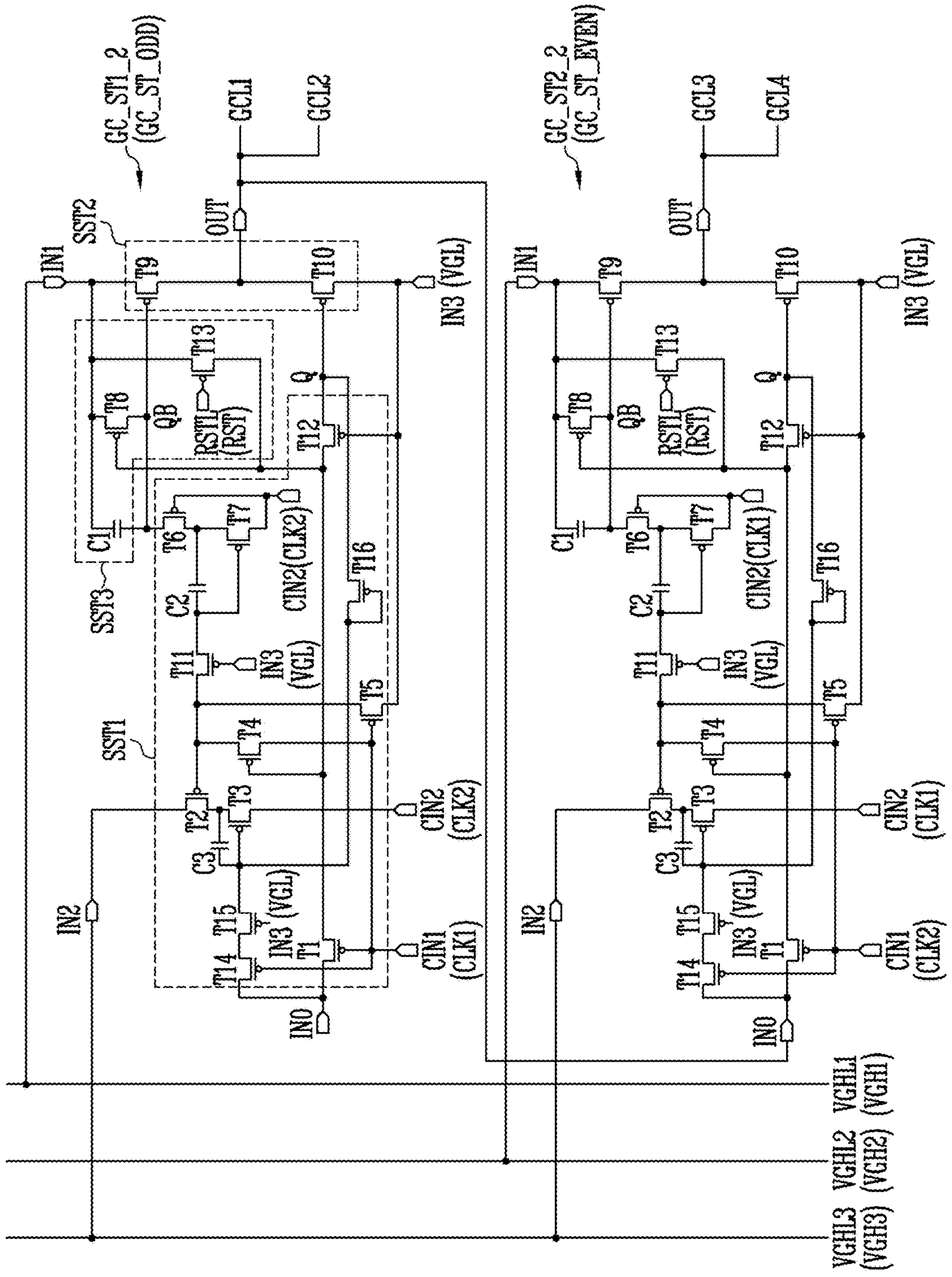
Figure 17:
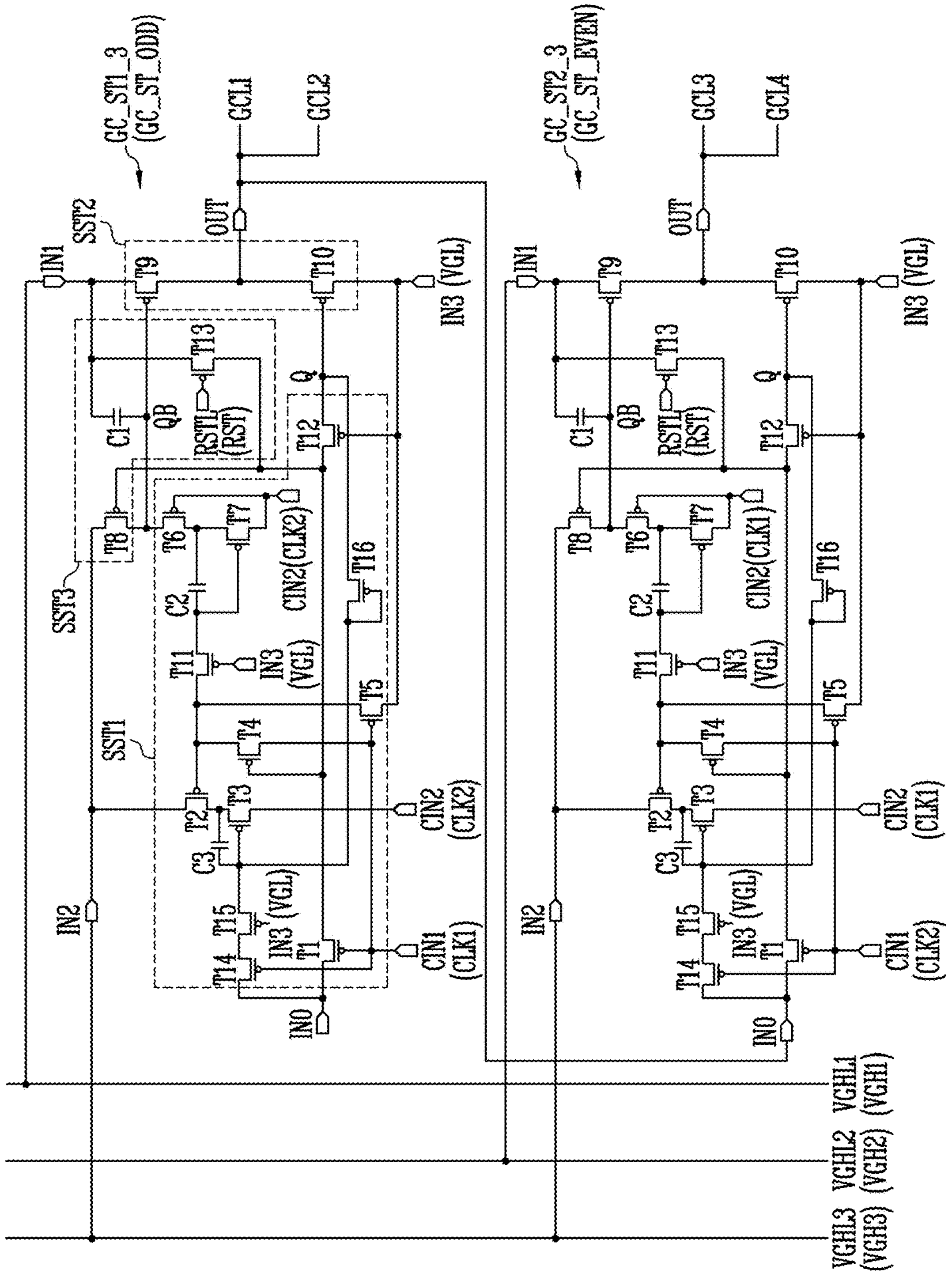

FIGS. 15, 16, and 17 are circuit diagrams illustrating various embodiments of the first compensation stage and the second compensation stage, which are included in the compensation gate driver shown in FIG. 13.

In an embodiment, referring to FIGS. 14 and 15, a first compensation stage GC_ST1_1 and a second compensation stage GC_ST2_1 shown in FIG. 15 may be substantially the same as or similar to the first compensation stage GC_ST1 and the second compensation stage GC_ST2, which are shown in FIG. 14, except for a connection configuration of the eighth transistor T8. The same or like elements shown in FIG. 15 have been labeled with the same reference characters as used above to describe the embodiments of the first compensation stage GC_ST1 and the second compensation stage GC_ST2 shown in FIG. 14, and any repetitive detailed description thereof will hereinafter be omitted or simplified.

In an embodiment, in the first compensation stage GC_ST1_1, the first electrode of the eighth transistor T8 may be connected to the third gate power line VGHL3 (or the second power input terminal IN2), instead of the second gate power line VGHL2. In such an embodiment, in the second compensation stage GC_ST2_1, the first electrode of the eighth transistor T8 may be connected to the third gate power line VGHL3, instead of the first gate power line VGHL1.

Referring to FIGS. 14 and 16, each of a first compensation stage GC_ST1_2 and a second compensation stage GC_ST2_2 may further include a fourteenth transistor T14, a fifteenth transistor T15, and a sixteenth transistor T16. The first compensation stage GC_ST1_2 and the second compensation stage GC_ST2_2 shown in FIG. 16 are substantially the same as the first compensation stage GC_ST1 and the second compensation stage GC_ST2 shown in FIG. 14, except for the fourteenth transistor T14, the fifteenth transistor T15, and the sixteenth transistor T16 . . . . In such an embodiment, the fourteenth transistor T14, the fifteenth transistor T15, and the sixteenth transistor T16 are substantially the same as those described with reference to FIG. 10, and any repetitive detailed descriptions thereof will be omitted.

In another alternative embodiment, referring to FIGS. 16 and 17, a first compensation stage GC_ST1_3 and a second compensation stage GC_ST2_3 shown in FIG. 17 may be substantially the same as or similar to the first compensation stage GC_ST1_2 and the second compensation stage GC_ST2_2, which are shown in FIG. 16, except for a connection configuration of the eighth transistor T8. The same or like elements shown in FIG. 15 have been labeled with the same reference characters as used above to describe the embodiments of the first compensation stage GC_ST1_2 and the second compensation stage GC_ST2_2 shown in FIG. 16, and any repetitive detailed description thereof will hereinafter be omitted or simplified.

In an embodiment, in the first compensation stage GC_ST1_3, the first electrode of the eighth transistor T8 may be connected to the third gate power line VGHL3 (or the second power input terminal IN2), instead of the second gate power line VGHL2. In such an embodiment, in the second compensation stage GC_ST2_3, the first electrode of the eighth transistor T8 may be connected to the third gate power line VGHL3, instead of the first gate power line VGHL1.

In accordance with embodiments of the disclosure, the gate driver and the display device including the gate driver include stages, and each of the stages includes an output unit which outputs a gate power voltage as a gate signal and a node controller which controls an operation of the output unit. The node controller is connected to a first gate power line, and the output unit is connected to a second gate power line different from the first gate power line. Thus, a fluctuation of a gate power voltage in the first gate power line has no influence on a gate power voltage in the second gate power voltage. Accordingly, a fluctuation of a gate signal generated based on the gate power voltage and a luminance difference due to the fluctuation may be reduced.

The invention should not be construed as being limited to the embodiments set forth herein. Rather, these embodiments are provided so that this disclosure will be thorough and complete and will fully convey the concept of the invention to those skilled in the art.

While the invention has been particularly shown and described with reference to embodiments thereof, it will be understood by those of ordinary skill in the art that various changes in form and details may be made therein without departing from the spirit or scope of the invention as defined by the following claims.

What is claimed is:

1. A display device comprising:
- a plurality of pixels formed in a display area;
- a first gate driver formed in a first gate circuit area, the first gate driver being coupled to a first gate power line;
- a second gate driver formed in the first gate circuit area, the second gate driver being coupled to a second gate power line; and
- a first pad formed in a pad area, the first pad receiving a gate power voltage,
- wherein the first gate power line and the second gate power line are connected to each other in a first region between the first and second gate drivers and the first pad, and then connected to the first pad, and
- wherein the gate power voltage from the first pad is applied to the first gate driver through the first gate power line and the gate power voltage from the first pad is applied to the second gate driver through the second gate power line.

2. The display device of claim 1, wherein the first gate driver output emission gate signals to emission gate lines connected to the plurality of pixels, and the second gate driver output write gate signals to write gate lines connected to the plurality of pixels.

3. The display device of claim 1, wherein the second gate driver is located between the display area and the first gate driver.

4. The display device of claim 1, further comprising:

a third gate driver formed in the first gate circuit area, the third gate driver being coupled to a third gate power line and a fourth gate power line; and a second pad formed in the pad area, wherein the third gate power line and the fourth gate power line are connected to each other in a second region between the third gate driver and the second pad, and then connected to the second pad.

5. The display device of claim 4, wherein the second gate driver is located between the display area and the first and third gate drivers, and the third gate driver is located between the second gate driver and the first gate driver.

6. The display device of claim 4, wherein the third gate driver is further coupled to a fifth gate power line, and the fifth gate power line is connected to the third and fourth gate power lines in the second region.

7. The display device of claim 6, wherein the fifth gate power line is connected to the second gate power line at an upper side of the first gate circuit area.

8. The display device of claim 7, wherein the fifth gate power line is further connected to the first gate power line at the upper side of the first gate circuit area.

9. The display device of claim 1, further comprising:

a third gate driver including a plurality of stages, wherein the plurality of stages includes a first stage and a second stage adjacent to the first stage, wherein the first stage includes a ninth transistor electrically connected between a third gate power line and an output terminal of the first stage, wherein the second stage includes a ninth transistor electrically connected between a fourth gate power line and an output terminal of the second stage.

10. The display device of claim 1, further comprising:

a fourth gate driver formed in a second gate circuit area, the fourth gate driver being coupled to the third gate power line and a fourth gate power line; and a third pad formed in the pad area, wherein the first gate circuit area is located at a first side of the display are, wherein the second gate circuit area is located at a second side of the display area that is opposite to the first side.

11. The display device of claim 10, wherein the third gate power line and the fourth gate power line are connected to the third pad in the pad area.

12. The display device of claim 1, further comprising:

a fourth gate driver formed in a second gate circuit area, the fourth gate driver being coupled to a third gate power line, a fourth gate power line and a fifth gate line; and a third pad formed in the pad area, wherein the first gate circuit area is located at a first side of the display are, wherein the second gate circuit area is located at a second side of the display area that is opposite to the first side.

13. The display device of claim 12, wherein the third gate power line, the fourth gate power line and the fifth gate line are connected to the third pad in the pad area.

* * * * *